United States Patent
Hirata et al.

[11] Patent Number: 5,272,540
[45] Date of Patent: Dec. 21, 1993

[54] TEMPERATURE COMPENSATING LENS SYSTEM FOR PROJECTION TELEVISION

[75] Inventors: Koji Hirata, Kamakura; Hiroki Yoshikawa, Hiratsuka; Tooru Numata, Chigasaki; Kiyoshi Wada, Yokohama; Masayuki Muranaka, Yokohama; Isao Yoshizaki, Yokohama; Takahiko Yoshida, Miura; Shigeru Inaoka, Yokohama, all of Japan

[73] Assignee: Hitachi, Ltd., Tokyo, Japan

[21] Appl. No.: 759,518

[22] Filed: Sep. 13, 1991

Related U.S. Application Data

[63] Continuation-in-part of Ser. No. 511,790, Apr. 20, 1990, Pat. No. 5,200,814.

[30] Foreign Application Priority Data

| Apr. 28, 1989 | [JP] | Japan | 1-107605 |
| Sep. 8, 1989 | [JP] | Japan | 1-231599 |
| Feb. 28, 1990 | [JP] | Japan | 2-045384 |
| Sep. 13, 1990 | [JP] | Japan | 2-241323 |

[51] Int. Cl.⁵ .......... H04N 5/74
[52] U.S. Cl. .......... 358/237; 359/764; 359/714
[58] Field of Search .......... 359/708, 713–717, 359/763, 764, 767, 649, 650; 358/231, 237

[56] References Cited

U.S. PATENT DOCUMENTS

| 4,776,681 | 10/1988 | Moskovich | 359/763 X |
| 4,838,670 | 6/1989 | Ueda | 359/764 X |
| 4,963,007 | 10/1990 | Moskovich | 357/708 X |
| 4,976,525 | 12/1990 | Matsumura et al. | 359/649 |
| 5,055,922 | 10/1991 | Wessling | 359/708 X |

Primary Examiner—Mark R. Powell
Attorney, Agent, or Firm—Antonelli, Terry, Stout & Kraus

[57] ABSTRACT

In a projection lens device having at least two plastic lenses for magnification-projecting an original image displayed on a display screen onto a screen, one of the two plastic lens is convex at a center thereof toward the screen and concave at a periphery thereof, and the other lens has a weak positive refractive power toward the screen at a center thereof and a stronger positive refractive power at a periphery thereof. A variation of a lens power due to a change of a surrounding environment is cancelled out by the concave shape at the periphery of the one lens and the positive refractive power at the periphery of the other lens.

58 Claims, 16 Drawing Sheets

TEMPERATURE COMPENSATING LENS SYSTEM FOR PROJECTION TELEVISION

This is a continuation-in-part application of the co-pending U.S. application Ser. No. 511,790 filed on Apr. 20, 1990 now U.S. Pat. No. 5,200,814.

BACKGROUND OF THE INVENTION

The present invention relates to a projection lens device suitable for use in a projection television device, and more particularly to a hybrid projection lens device which uses glass lenses and plastic lenses.

In a so-called projection television device which projects an original image on a fluorescent face of a Braun tube (CRT) onto a screen through a projection lens device, a focusing performance thereof has recently been advanced remarkably and a requirement for the performance of the projection lens device which is a key component of the television device is becoming more and more strict year by year.

Under such a circumstance, a plastic lens which has a large freedom of aberration correction because of ease of making a lens surface aspherical, ease of manufacture a large diameter lens and which has a high mass productivity is arranged as a principal one of the lenses in the projection lens device. Initially, a projection lens device which consists of only a plastic lenses has been a utilized but present days a hybrid system which uses glass lenses (spherical lenses) and aspherical plastic lenses is utilized.

A reason therefor is that where the projection lens device consists of only the plastic lenses, reflective indices and shapes thereof change with a change of temperature and focal points vary and a focusing performance is lowered. (Hereinafter, such reduction of the focusing performance is referred to as a temperature drift of focus.)

JP-A-63-264716 and JP-A-61-106427 disclose specific technical means for solving the above problem. The prior arts disclosed therein relate to a 5-group projection lens device is which ① most of positive reflective powers of an overall lens system are shared by a group of lenses, which are glass lenses so that the temperature drift of focus is substantially reduced, and ②, first group of lenses form a positive lens while a second group of lenses form a negative lens so that changes in refractive powers of the lenses (due to the changes in the reflective indices) caused by the temperature drift are cancelled out.

It may be concluded that the prior art projection lens device disclosed in the above references is an excellent projection lens device which reduces the temperature drift of focus by an optimum design of the lens arrangement.

In the lens arrangement of the above prior art, the second group of lenses which comprise a concave lens is arranged closely to a screen side of the third group of lenses in order to reduce a spherical aberration, an astigmatism and a coma aberration caused by an aperture. As a result, a position of an incident pupil of the overall lens system moves toward a screen which is an image point, away from the center of the third group of lenses. Thus, when it is intended to attain a wide field angle (short projection distance) by the prior art projection lens device, it is very difficult to compensate a distortion aberration and an astigmatism.

Where a sufficiently high periphery light intensity ratio is desired in addition to the large diameter, outer diameters of component lenses increase and a manufacturing cost increases.

By the reasons described above, it has been very difficult to attain the wide field angle (short projection distance) by the prior art projection lens device.

Further, the above prior art references disclose nothing about the changes in the lens shapes caused by expansion and shrinkage of the lenses due to the temperature change and a solution therefor, and they lack practicability.

SUMMARY OF THE INVENTION

It is an object of the present invention to provide a projection lens device which sufficiently reduces temperature and humidity drifts of a focusing performance and attains a wide field angle (short projection distance), and a projection television device which uses such a projection lens device.

In order to achieve the above object, the present invention provides the following solution. In order to reduce the reduction of the focusing performance by the temperature and humidity drifts in a near-axis system, most of positive refractive powers of an overall system of the projection lens device are shared by glass lenses (hereinafter referred to as glass power lenses). A concave lens is not disposed in the vicinity of the glass power lens but a plastic aspherical lens having a weak positive refractive power near an optical axis is disposed.

As a result, an incident pupil does not move toward a screen and away from the glass power lens and a wide field angle projection lens device is attained.

On the other hand, an aberration due to an aperture is compensated by an aspherical shape of a portion (periphery of the lens) spaced from the optical axis. A chnage in a refractive power of a local lens surface due to the temperature and humidity drifts of the lens periphery portion of aspherical shape is cancelled out by a combination of a plurality of plastic non-sherical lenses.

In the manner described above, high precision temperature and humidity compensation of the focusing performance is attained.

The above object is further achieved by constructing a lens bodytube and lenses such that a lens shape is forcibly deformed in a loaded status in order to prevent free change of shapes of two types of plastic non-spherical lenses by temperature and humidity or to permit easy cancellation of such change of shapes if they appear.

Functions of technical means for solving the problems in accordance with the present invention are now explained with reference to FIGS. 2, 3 and 4.

FIG. 2 shows a longitudinal view for explaining means for reducing the temperature and humidity drifts of the focus in the projection lens device of the present invention.

In FIG. 2, numeral 1 denotes a first group lens numeral 2 denotes a second group lens, numeral 3 denotes a third group lens (which is a cemented doublet glass lens comprising a lens 3a and a lens 3b), numeral 4 denotes a fourth group lens, numeral 5 denotes a fifth group lens, numeral 6 denotes cooling liquid and numeral 13 denotes a screen.

Referring to FIG. 2, RAY 1 denotes an upper limit of a light ray among the light rays from a center point A of a Braun tube fluorescent face $P_1$, which is effective for focusing (reaches the screen 13), and RAY 2 denotes a lower limit, RAY 3 denotes an upper limit of a light ray among the light rays from an object point B in a periphery of an image plane, which is effective for focusing an image, and RAY 4 denotes a lower limit.

For a sake of convenience of explanation, a six-lens projection lens system which is a hybrid system having glass lenses 3a and 3b and other plastic lenses is shown.

Means for reducing the temperature drift of focus at the center of the image plane is first explained. The first group lens 1 and the second group lens 2 which are the plastic aspherical lenses are shaped in the vicinity of the optical axis to provide a weak positive refractive power. In this manner, an affect of the changes in the refractive powers of the above two lens by temperature to a refractive power of an overall system of the projection lens device (most of which are shared by the glass lenses) is reduced.

As shown in FIG. 3 which is an enlarged view of a portion A of FIG. 2, a shape of the periphery of the lens is of concave lens shape (a refractive power of a partial lens is $-\phi_1$) for the first group lens 1, and of convex lens shape (a refractive power of a partial lens is $\phi_4$) for the second group of lens 2, and the refractive powers of those partial lenses are substantially equal, that is, $\phi_1 \approx \phi_4$.

Means for reducing the temperature drift of focus at the periphery of the image plane is now explained.

Turning back to FIG. 2, the upper limit light RAY 3 and the lower limit light RAY 4 of the image light from the off-axis object point B pass above the optical axis in the first group lens 1 which is the plastic non-spherical lens as seen from FIG. 4 which is an enlarged view of the portion A in FIG. 2.

The shape in the pass area is of concave lens shape generally centered at the position through which a principal light ray passes. On the other hand, the shape of the light pass area in the second group lens 2 is of a weak convex lens shape in the vicinity of the optical axis. A refractive power $(-\phi_5)$ of the partial concave lens in the area between the principal light ray of the first group lens 1 and the upper limit light RAY 3, and a refractive power $\phi_7$ of the partial convex lens of the second group lens 2 are substantially equal.

Similarly, a refractive power $(-\phi_6)$ of a partial concave lens in the area between the principal light ray of the first group lens 1 and the lower limit light RAY 4, and a refractive power $\phi_8$ of the partial convex lens of the second group lens 2 are substantially equal.

While the above description is for a meridional plane for the sake of convenience of explanation, it should be noted that the same function is provided for a sagittal plane.

As described above, in order to reduce the temperature drift of focus, the first group lens 1 and the second group lens 2 are designed such that the refractive powers of the partial lenses thereof are substantially equal.

Further, in order to reduce the reduction (aberration) of focusing performance caused by the expansion and contract of the lenses by the temperature change the first group lens 1 and the second group lens 2 are designed such that the refractive powers of the partial lenses thereof are substantially equal to cancel out each other. It is preferable to provide means for radially binding the first group lens 1 or the second group lens 2 or both thereof at areas other than as effective diameter of the lens so that the lens is forcibly deformed when it is expanded to enhance the refractive power of the partial lens in order to enhance the cancellation effect.

DESCRIPTION OF THE PREFERRED EMBODIMENTS

Figure 9:
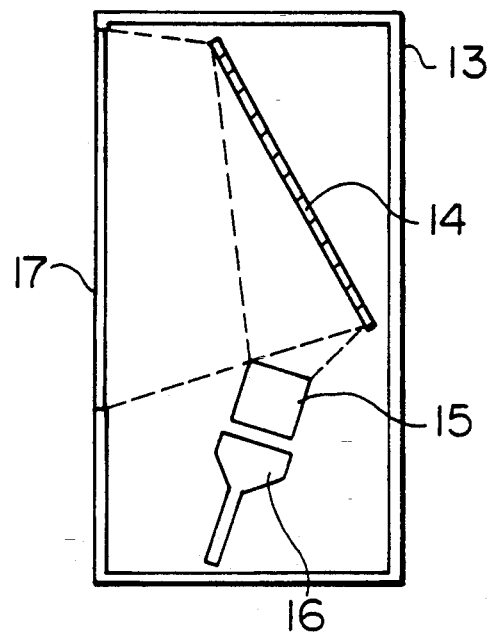
FIG. 9 shows a longitudinal sectional view of a projection television device which uses the projection lens device of the present invention.

A projection lens device of the present invention is now described. FIGS. 1, 5, 6, 7 and 8 show longitudinal sectional views of principal parts of the projection lens devices for a projection television device, in accordance with the embodiments of the present invention. In the same figures, $P_1$ denotes the fluorescent face of a cathode-ray tube; numeral 7 denotes a panel of the cathode-ray tube; numeral 6 denotes a cooling liquid; numeral 5, a fifth group lens; numeral 4, a fourth group lens; numeral 3, a third group lens; numeral 2, a second group lens; and numeral 1, a first group lens. An inner barrel 8 in which are incorporated the first lens 1 to the fourth lens 4 is positioned and fixed to an outer barrel 9 with fixing bolts 11. The outer barrel 9 is fixed with bolts to a bracket 10 through a fixing plate 12. The optical system of this embodiment is constructed so that the best performance is obtained when a 5.4 inch raster on the CRT fluorescent face is magnified and projected onto a screen. The magnification in such magnified projection is 8.4× in the case of the lens data shown in Tables 1(A), 1(B) and Tables 2(A), 2(B), and it is 9.3× in the case of the lens data shown in Tables 3 to 7. The field angle of lens is 72° in the examples shown in Tables 1 and 2, while it is 78° in the examples shown in Tables 3 to 7. In both cases, wide field angles are realized, and even where only one turn-up mirror 14 is used as shown in FIG. 9, it is possible to realize a sufficiently compact set. The first group lens 1 is of an aspherical shape for eliminating spherical aberration due to the lens aperture. The second group lens 2 is of an aspherical shape for eliminating astigmatism and coma aberration. The third group lens 3 is constituted by a glass lens and has as large a power as possible in order to diminish focus drift caused by change of temperature. The fourth group lens 4, of a high order, has an aspherical shape and has as small a power as possible, in order to eliminate coma abberation. The fifth group lens 5 is one for the correction of curvature of image field, having an aspherical surface at its interface to air for the correction of an off-axis sagittal aberration. The CRT fluorescent face $P_1$ has a curvature for the correction of an image field curvature. In particular, if the fluorescent face $P_1$ is made aspherical for correcting an image field curvature of a high order, it will become possible to effect a more accurate correction.

Generally, one fluorescent face $P_1$ of the CRT panel 6 is formed by pressing and not subjected to a post-processing. Therefore, no matter whether its shape after pressing is spherical or aspherical, the manufacturing method itself does not change.

On the other hand, the lenses of the present lens system are constituted by plastic lenses and are designed to minimize power, whereby they are thinned. Besides, the formability is improved by reducing the difference in wall thickness between the central portion and the peripheral portion.

Figure 10:
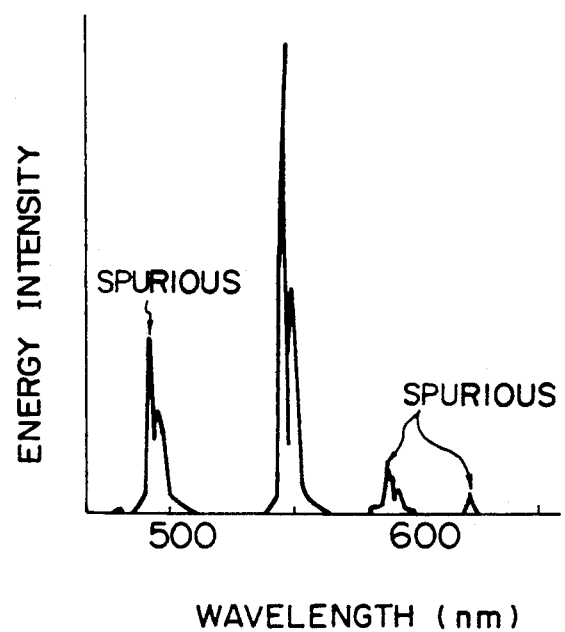
FIG. 10 shows a light emission spectrum characteristic of a green phosphor.
Figure 13:
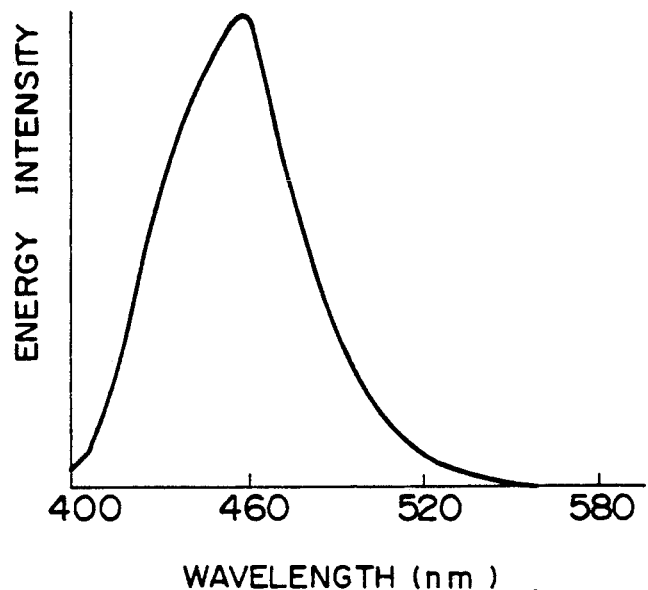
FIG. 13 shows a light emission spectrum characteristic of a blue phosphor.
Figure 14:
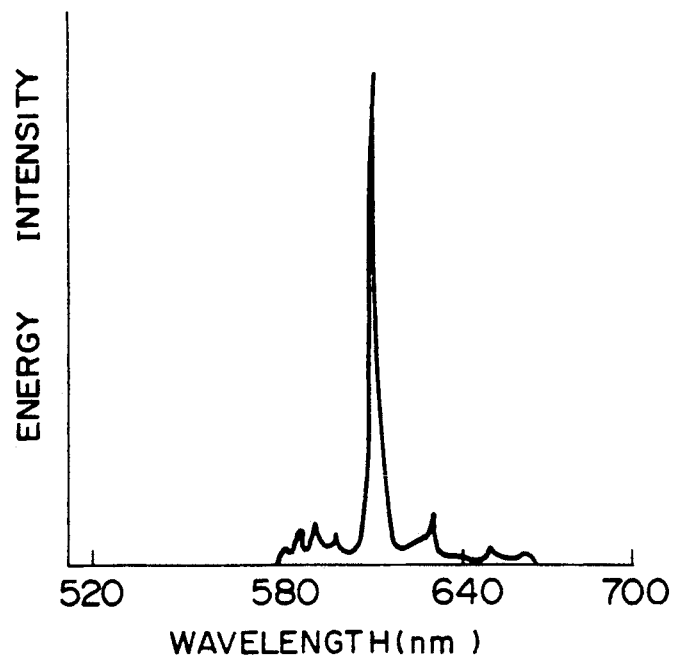
FIG. 14 shows a light emission spectrum characteristic of a red phosphor.

A technique to reduce a chromatic aberration is now explained. Light emission spectra for the currently used green, blue and red phosphors are shown in FIG. 10, 13 and 14, respectively. The light emission spectra of the respective phosphore are not of single wavelength and chromatic aberration is caused when the image is enlarged in the projection by the lenses.

Figure 11:
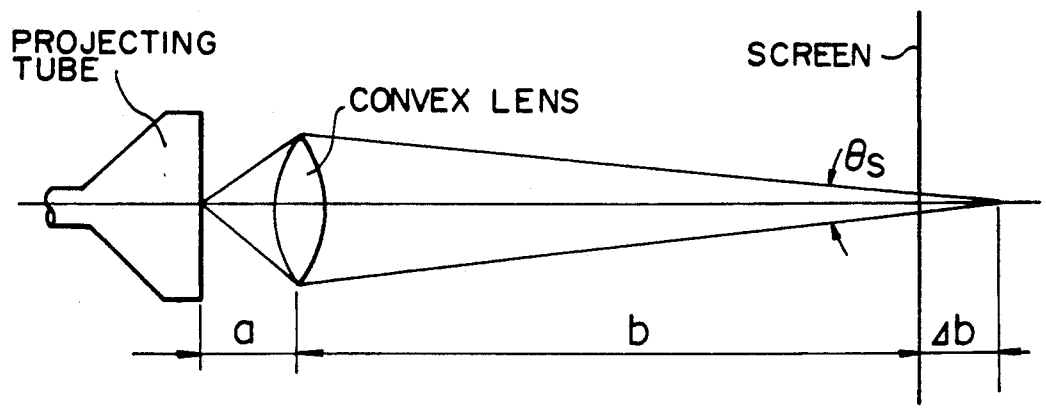
FIGS. 11 and 12 show views used to explain the present invention.

Conventional projection lenses range in focal length from 100 mm to 140 mm, while in the embodiment of the invention the focal length of an entire projection lens system is about 80 mm as shown in Table 8 and thus the reduction of chromatic aberration is realized. The following description is now provided with reference to drawings about diminishing chromatic aberration by shortening the focal length. FIG. 11 is a longitudinal sectional view for explaining means for reducing an on-axis chromatic aberration. Assuming that the projection lens is a single thin-walled lens of a focal length f, and that the fluorescent face—lens spacing and the lens—screen spacing are a and b, respectively, the following imaging equation is given:

$$\frac{1}{a} + \frac{1}{b} = \frac{1}{f} \tag{1}$$

If the radii of curvature of both surfaces of the lens are $r_1$ and $r_2$, $$\frac{1}{f} = (N-1)\left(\frac{1}{r_1} - \frac{1}{r_2}\right) \tag{2}$$

$$\frac{\Delta f}{f} = \frac{1}{N-1} \cdot \Delta N \tag{3}$$

The increase of the spot diameter, $\Delta d$, is given by the following equation using F number and magnification M:

$$\Delta d = \Delta b \cdot \theta_s \approx \frac{\Delta b}{F \cdot M} \tag{4}$$

From the equations (1)-(4):

$$\Delta d = \frac{(1+m)^2 \cdot f}{F \cdot M} \cdot \frac{\Delta N}{N-1} \tag{5}$$

And:

$$M \cdot f \approx b \tag{6}$$

Figure 12:
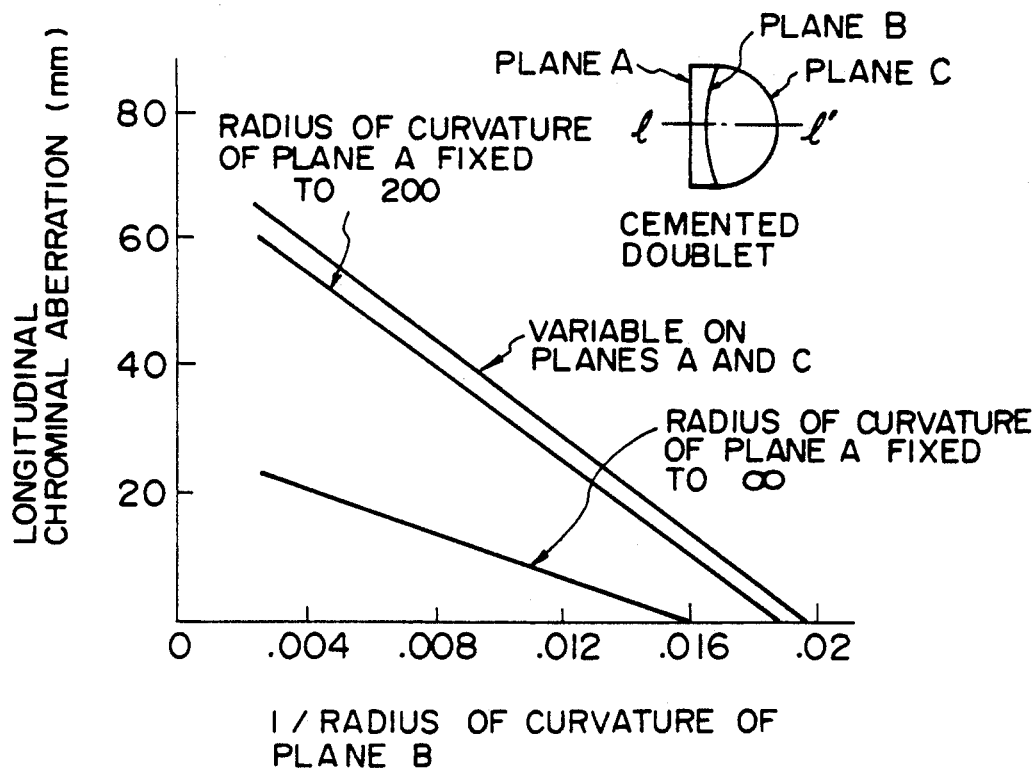
Figure 15:
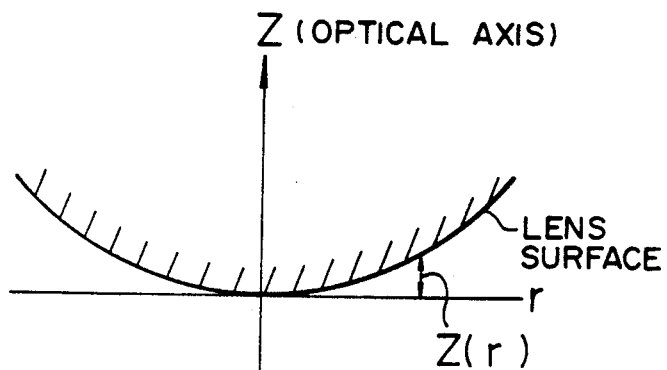
FIGS. 15 and 16 show views used to explain a definition of lens shape.
Figure 16:
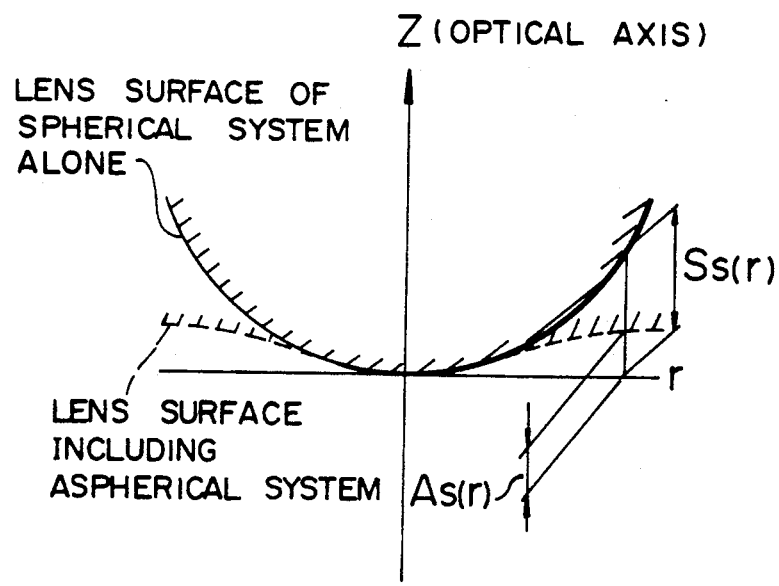

Thus, the increases of the spot diameter, $\Delta d$, due to chromatic aberration is proportional to the focal length f. In addition to the reduction of chromatic aberration described above, the third group lens 3 in this embodiment is constituted by a cemented doublet consisting of lenses 3a and 3b. (In this embodiment, if corresponds to Tables 1, 2, 3(C), 4(C), 5(C) and 6). The lens 3b is a concave lens made of a high dispersion material, while the lens 3a is a convex lens made of a low dispersion material. Chromatic aberration is diminished by cementing the two together. FIG. 12 shows the results of calculation made about a longitudinal chromatic aberration generated in the projection lens described above. In the coordinates of a sectional view of the lens shown in the same figure, assuming that a direction from an optical axis 0 of the lens to an optical axis 1' is a positive direction, the radius of curvature of the surface B has a positive sign because the radius of curvature is assumed to be positive when the center lies in the positive direction. The axis of abscissa in FIG. 12 represents the reciprocal of the radius of curvature of the cemented surface B, and from this figure it is seen that a longitudinal chromatic aberration can be diminished by reducing the radius of curvature of the surface B. However, the reduction of the radius of curvature of the surface B results in increase in the amount of sag at the outermost peripheral portion. Consequently, if a marginal portion of the lens is ensured, the convex lens becomes very large in its wall thickness. For this reason, the radius of curvature of the surface B cannot be reduced so much. In the case where the radius of curvature of the surface B is fixed, as is apparent from FIG. 11, the function of the concave lens is enhanced and the chromatic aberration correcting ability is greatly improved by making the surface A, namely the CRT-side face, planar or convex (not shown) toward the screen rather than making it convex toward the CRT. In the projection lens device of the present invention, chromatic aberration can be diminished to a great extent by making the CRT-side surface of the foregoing concave lens of high dispersion, planar or convex toward the screen. Specific lens data of the projection lens device of the present invention described above are as shown in Tables 1 to 7. How to interpret these lens data will now be explained with reference to Table 1(A). In Table 1(A), data are divided to those for a spherical system which mainly covers the lens area near the optical axis and those for an aspherical system which covers the outer peripheral portion. It is shown that, the radius of curvature of the screen is $\infty$ (i.e. plane); the distance (space between faces) on the optical axis from the screen to the surface $S_1$ of the first lens group 1 is 787.6 mm; and the refractive index of the medium (air) therebetween is 1.0. It is also shown therein that the radius of curvature of the surface $S_1$ of the first lens group 1 is 97.999 mm (the center of curvature is on the fluorescent face side), that the spacing (space between faces) on the optical axis between the lens surfaces $S_1$ and $S_2$ is 8.874 mm, and that the refractive index of the medium therebetween is 1.49334. Further data are shown likewise, and lastly it is shown that the radius of curvature of the fluorescent face $P_1$ of the CRT panel 7 is 341.28 mm, that the thickness on the optical axis of the CRT panel 7 is 13.4 mm, and that the refractive index is 1.53983. Next, in Table 1(B) there are shown aspherical coefficients with respect to the surfaces $S_1$, $S_2$ of the first group lens 1, the surfaces $S_3$, $S_4$ of the second group lens 2, the surfaces $S_8$, $S_9$ of the fourth group lens 4, the surface $S_{10}$ of the fifth group lens 5, and the fluorescent face $P_1$. The aspherical coefficients as referred to herein indicate coefficients obtained when the face shape is expressed by the following equation:

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

where Z represents the height function of r) of the lens surface when the optical axis direction is plotted along Z axis and the radial direction of the lens is plotted along r axis, as shown in FIGS. 15 and 16; r represents a radial distance; and $R_D$ represents a radius of curvature. Therefore, once the coefficients CC, AE, AF, AG and AH are given, the lens surface height, that is, the shape, is determined in accordance with the above equation. FIG. 16 is a view explanatory of aspherical surface. By substituting into the above aspherical terms the respective values there is obtained a lens surface which is deviated by $S_{S(r)} - A_{S(r)}$ from the lens surface in the spherical system alone. The surface $S_{11}$ of the fifth group lens 5 in Table 1 indicates that all of the aspherical coefficients are zero and the lens surface is spherical. The method of interpreting the data shown in Tables 1(A) and 1(B) has been described above. Tables 2 to 7 show specific examples of other lens data. Tables 3(C), 4(C) and 5(C) show lens data in the case where cemented convex doublet consisting of a concave lens of high dispersion and a convex lens of low dispersion is used as the third group lens 3 shown in the respective tables (A). According to the projection lenses of the present invention, as is apparent from those tables, a high focusing performance can be attained without change in shape of the first, second, fourth and fifth group correction lenses even in the case where the convex glass lens as the third group lens 3 is changed to the cemented convex lens of concave and convex lenses.

Figure 1:
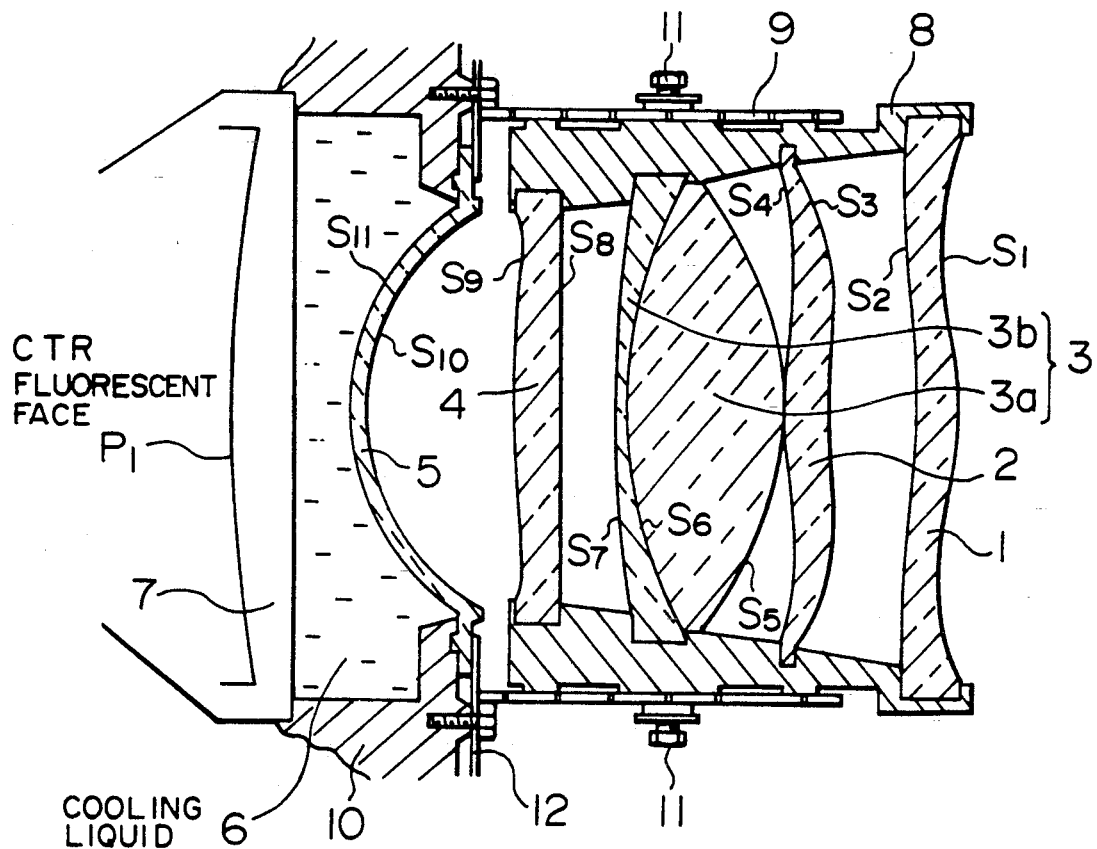
FIGS. 1 and 5 to 8 show sectional views of embodiments of a projection lens device of the present invention.
Figure 2:
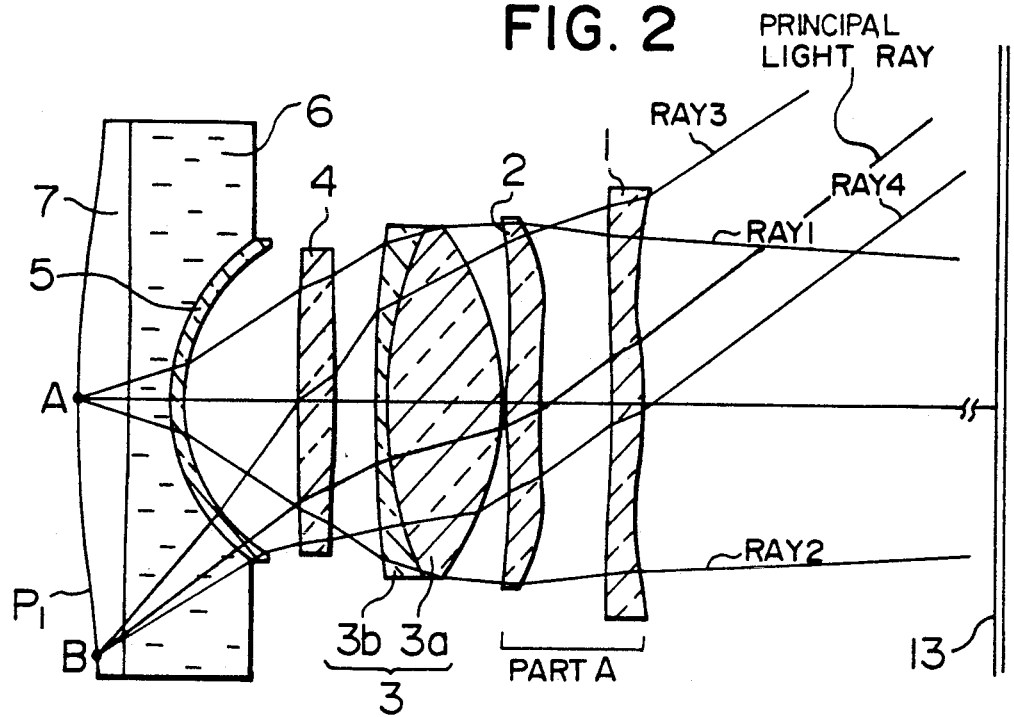
FIGS. 2 to 4 show lenses for explaining a principle of operation of the projection lens device of the present invention.
Figure 5:
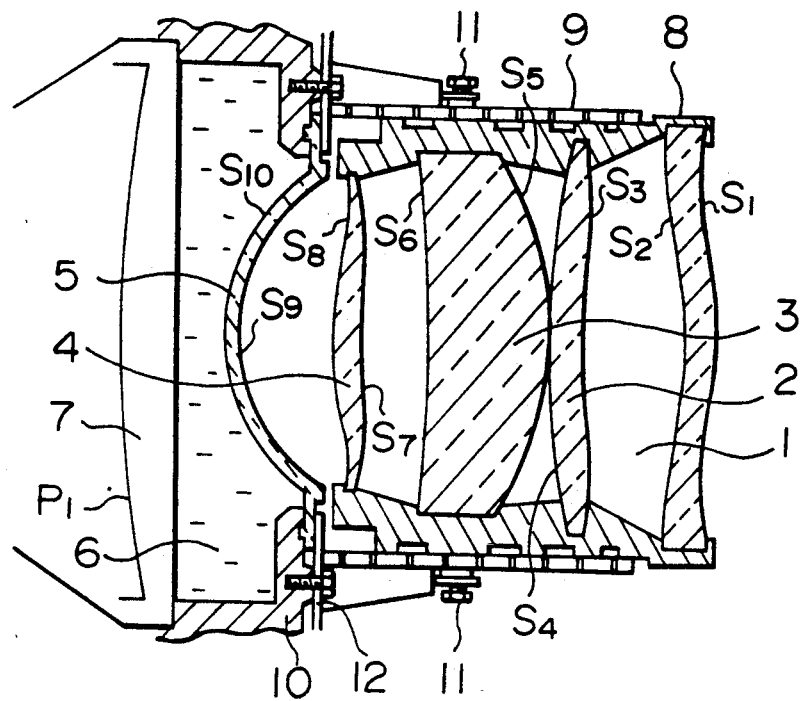
Figure 6:
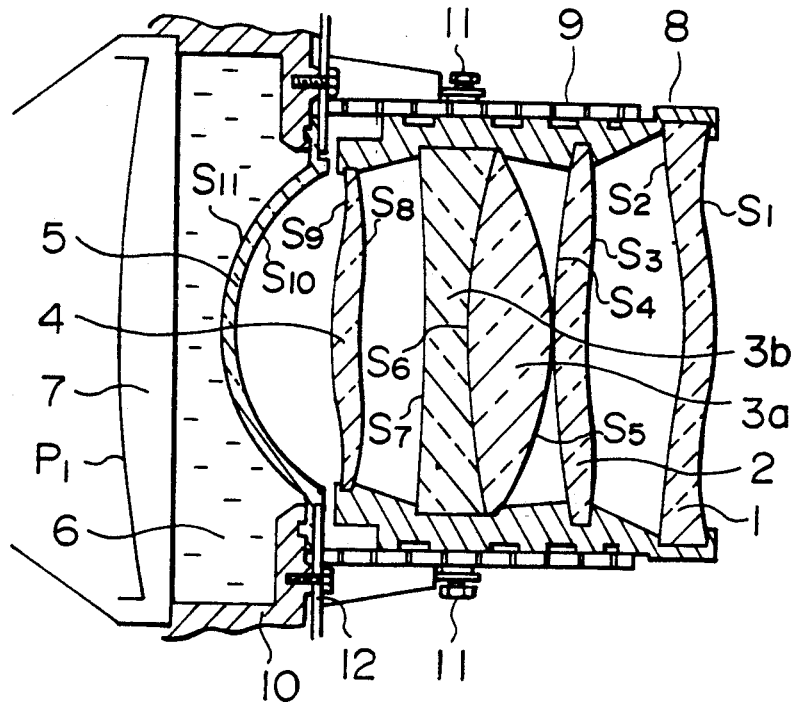
Figure 7:
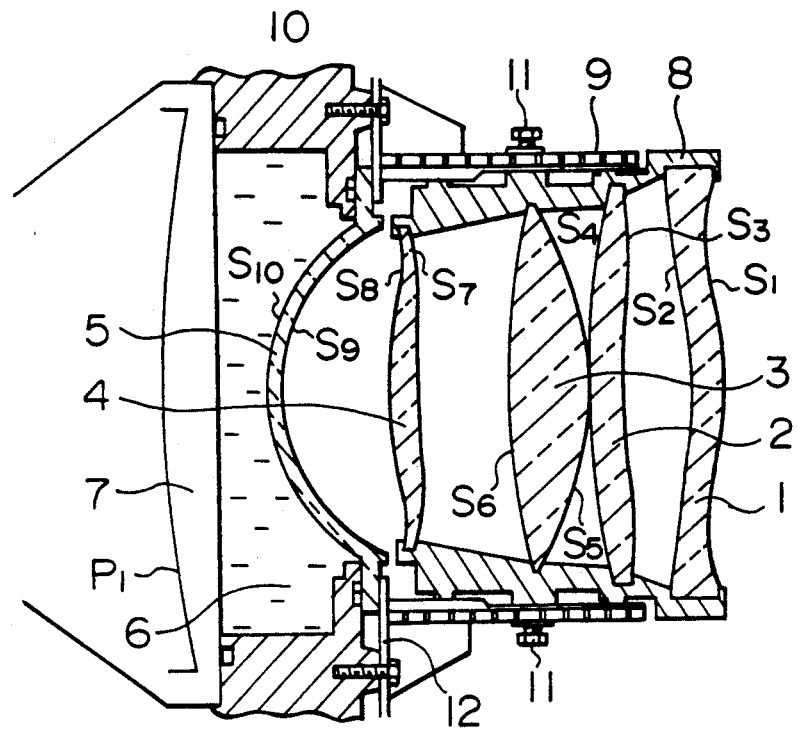
Figure 8:
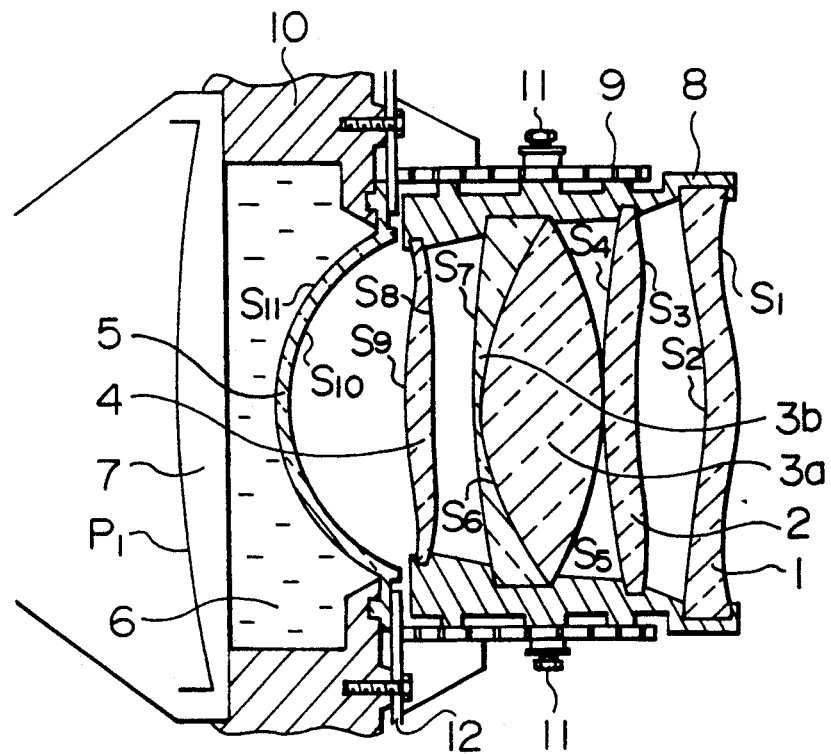

FIG. 1 is side sectional view of projection lens device corresponding to the lens data of Tables 1(A) and 1(B). Further, FIGS. 7 and 8 correspond to Tables 7 and 6, respectively. The fifth group lens 5 used in both examples is of the same shape to attain sharing of constituent lens. FIG. 5 is a side sectional view of projection lens device corresponding to the lens data of Tables 3(A) and 3(B), and FIG. 6 is a side sectional view of projection lens device corresponding to the lens data of Tables 3(B) and 3(C).

FIGS. 17 to 23 shows the results of evaluation on the focusing characteristic based on MTF (Modulation Transfer Function) obtained when a 5.4 inch image on the fluorescent face is projected magnifiedly onto the screen, using the projection lens device of the present invention described above. The phosphor emission spectrum shown in FIG. 10 was used.

Figure 3:
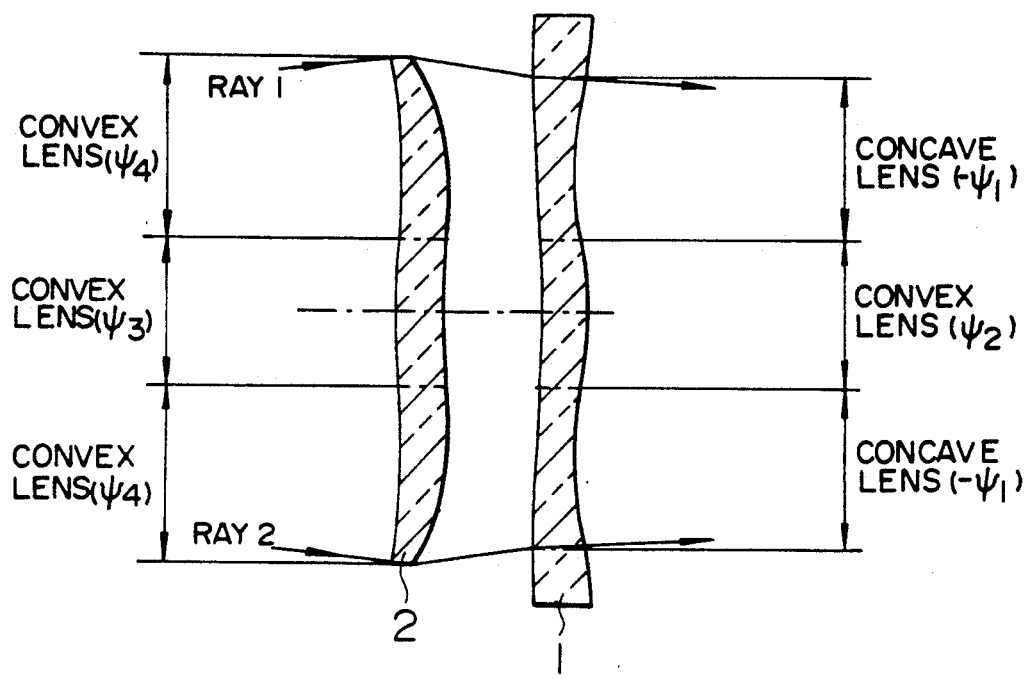
Figure 4:
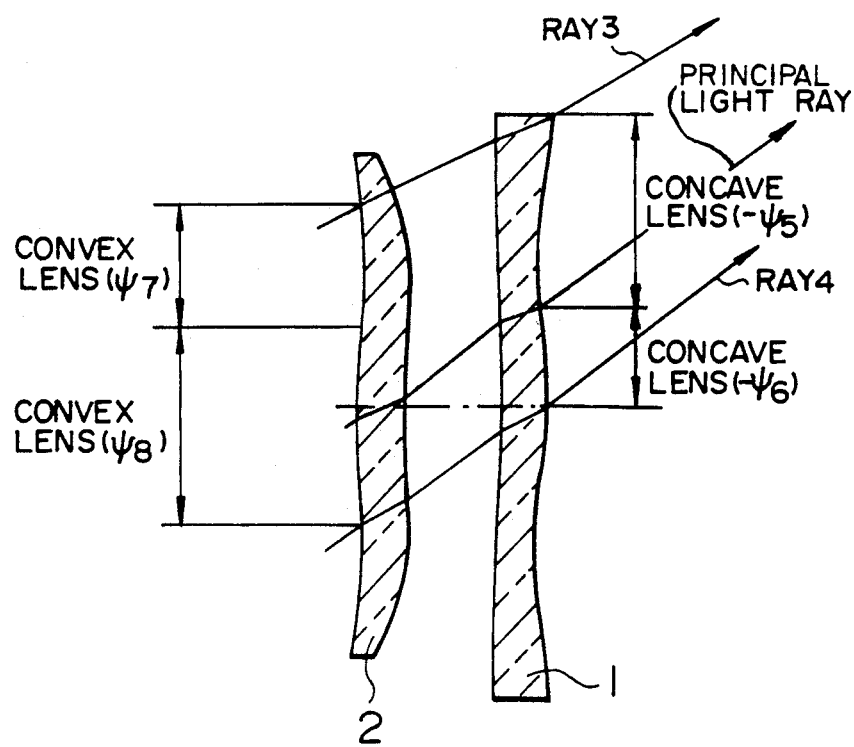
Figure 17:
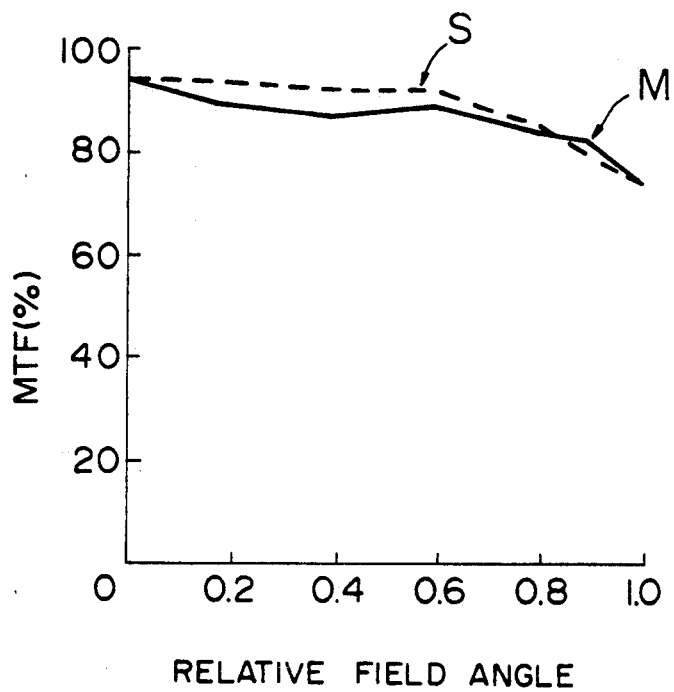
FIGS. 17 to 23 show MTF characteristics of the projection lens devices in the embodiments of the present invention.
Figure 18:
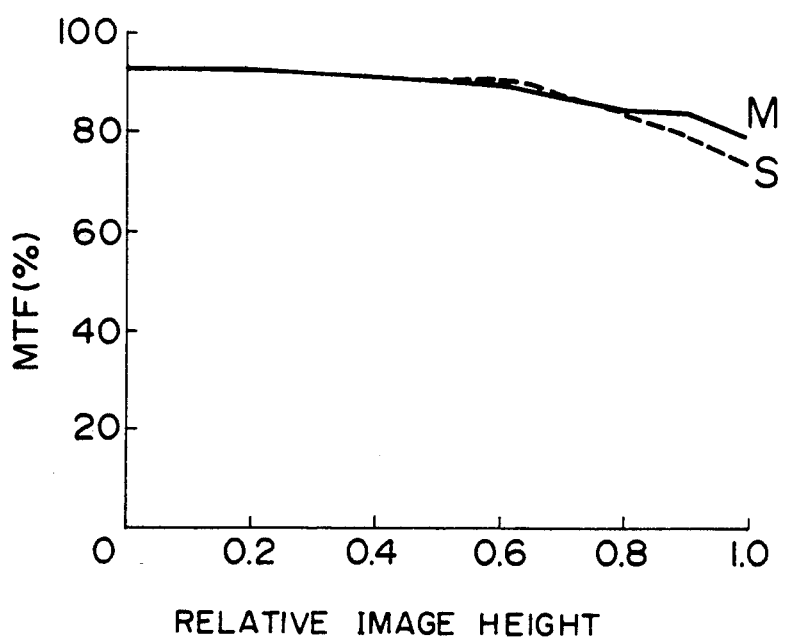
Figure 19:
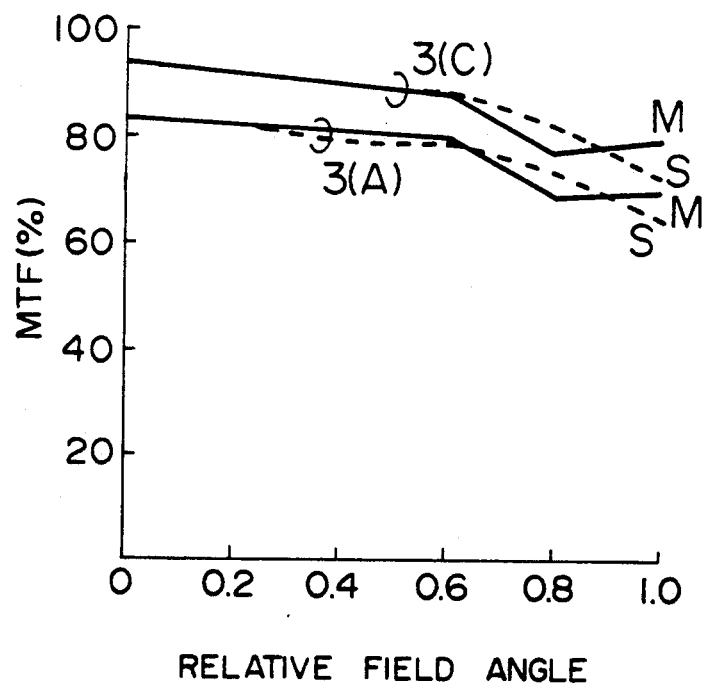
Figure 20:
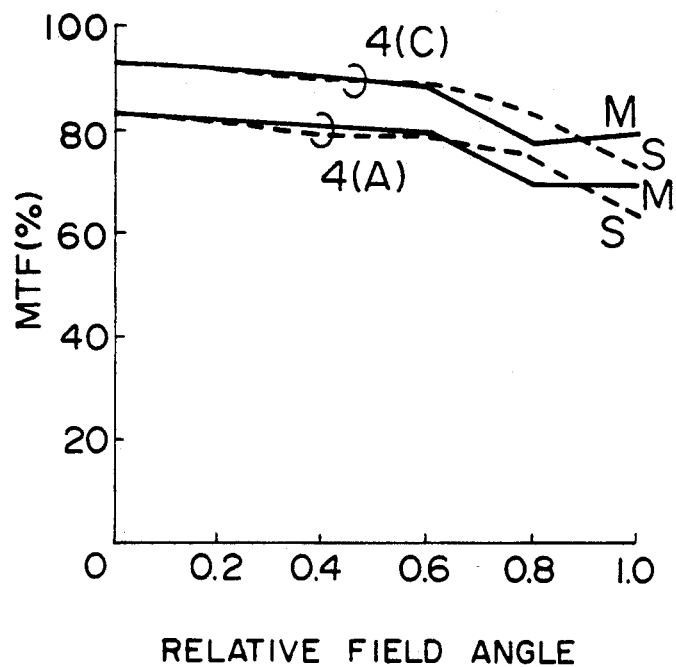
Figure 21:
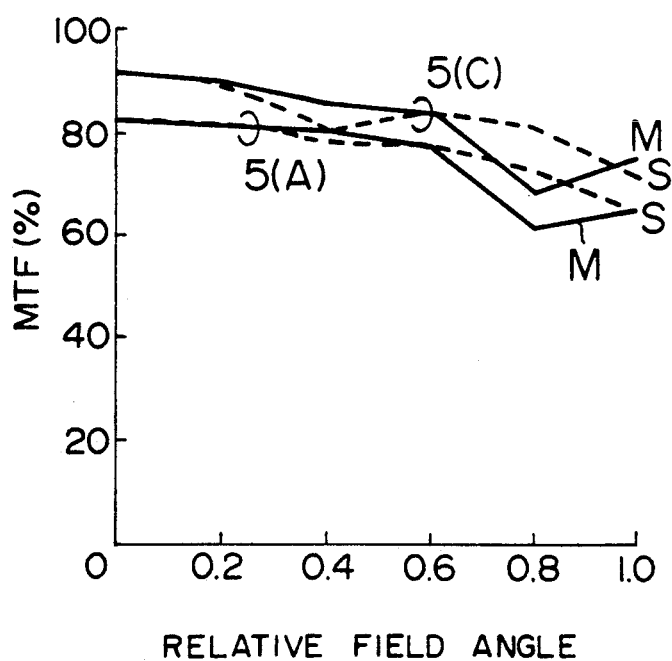
Figure 22:
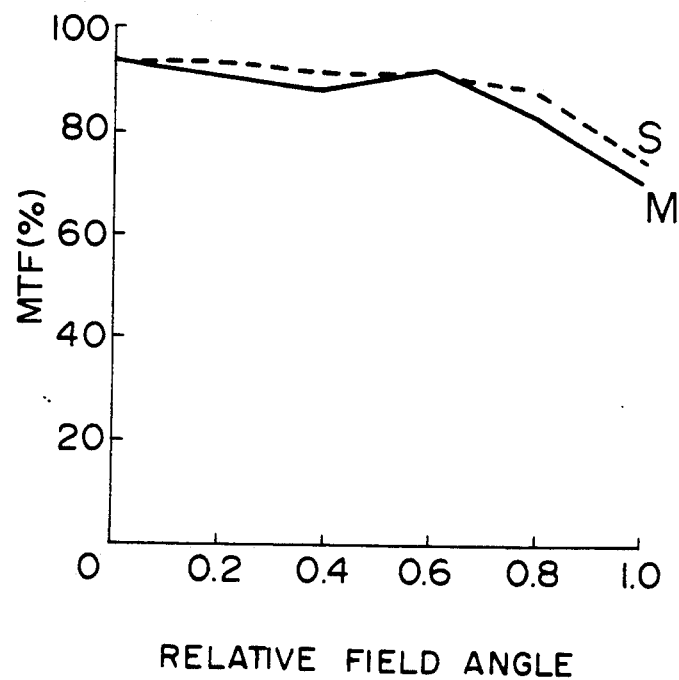
Figure 23:
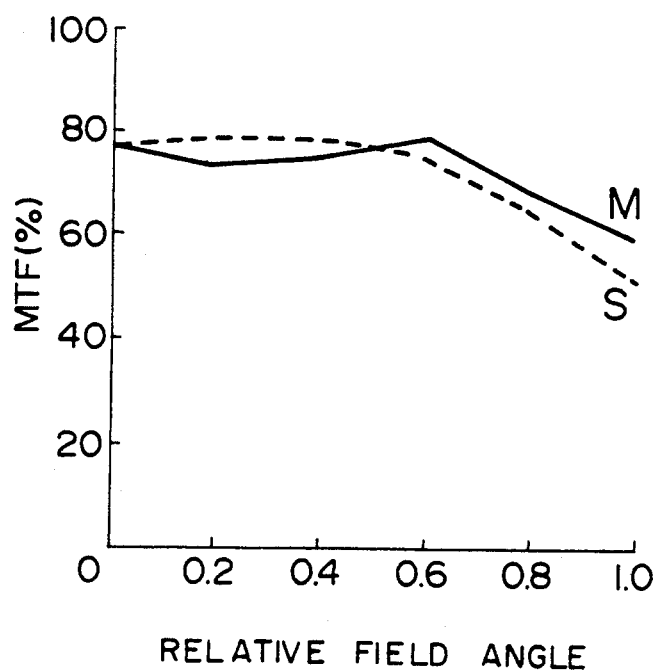

FIG. 17 is a characteristic diagram corresponding to Tables 1(A) and 1(B); FIG. 18 is a characteristic diagram corresponding to Tables 2(A) and 2(B); FIG. 19, 3(A) and 3(C) are characteristic diagrams corresponding to Tables 3(A), (B) and Tables 3(B), (C), respectively; FIG. 20, 4(A) and 4(C) are characteristic diagrams corresponding to Tables 4(A), (B) and 4(B), (C), respectively; FIG. 21, 5(A) and 5(C) are characteristic diagrams corresponding to Tables 5(A), (B) and 5(B), (C), respectively, FIG. 22 is a characteristic diagram corresponding to Tables 6(A) and (B), and FIG. 23 is a characteristic diagram corresponding to Tables 7(A) and (B). In the illustrated case, 300 TV lines are taken as black and white stripe signals. It is seen that good MTF characteristics are exhibited in FIGS. 17 to 23.

Further, from comparison between (A) and (C) in each of FIGS. 19, 20 and 21, it is seen that a focusing performance improving effect is attained by the use of the cemented convex double consisting of concave and convex lenses of high and low dispersion, respectively. In the examples shown in Table 1 to 7, assuming that the focal length of the entire system is $f_0$ and the focal lengths of the first to fifth group lenses are $f_1$, $f_2$, $f_3$, $f_4$ and $f_5$, respectively, there exist the relationships shown in Table 8, namely:

$$0.14 < f_0/f_1 < 0.25$$

$$0.02 < f_0/f_2 < 0.25$$

$$0.63 < f_0/f_3 < 0.83$$

$$0.21 < f_0/f_4 < 0.31$$

$$-0.58 < f_0/f_5 < -0.50$$

In this embodiment, most of the positive refractive power of the entire lens system is shared by the third group lens 3 which is a glass lens, whereby the temperature drift of focus is diminished. Also when a shared use of other lenses is desired, the above method is desirable.

Now, the shape of lens surface will be explained. The following is applicable to the aspherical shapes of the screen-side lens surface $S_1$ of the first group lens 1, the second group-side lens surface $S_2$ thereof, the first group-side lens surface $S_3$ of the second group lens 2, the third group-side lens surface $S_4$ thereof, the third groupe side lens surface $S_8$ ($S_7$ in FIGS. 5 and 7) of the fourth group lens 4 and the fifth group-side lens surface $S_9$ in FIGS. 5 and 7) of the fourth group lens 4. Explanation will be given below with reference to FIG. 16.

FIG. 16 is an explanatory view showing an aspherical lens shape. When the optical axis direction is plotted along Z axis in the radial direction of the lens, if the height of lens surface is of a spherical system of $R_D$ alone and if the substitution of the aspherical coefficients CC, AE, AF, AG and AH into the equation (1) is expressed by $A_{S(r)}$, the following relationship exists, as shown in Table 9, as the $A_{S(r)}$ to $S_{S(r)}$ ratio of the screen-side lens surface of the first group lens 1 if the clap radius is substituted into r:

$$-0.08 < A_2/S_2 < 0.05$$

Likewise, as to the second group-side lens surface of the first group lens 1, the following relationship exists:

$$0.20 < A_s/S_s < 0.52$$

As to the first group-side lens surface of the second group lens 2, the following relationship is valid, as shown in Table 10:

$$-1.26 < A_s/S_s < 0.06$$

Similarly, as to the third group-side lens surface of the second group lens 2, the following relationship is valid:

$$-0.11 < A_s/S_2 < 1.16$$

Further, as to the third group-side lens surface of the fourth group lens 4, the following relationship holds good, as shown in Table 11:

$$-3.29 < A_s/S_s < 5.19$$

Likewise, as to fifth group-side lens surface of the fourth group lens 4, there exists the following relationship:

$$-1.58 < A_s/S_s < 0.21$$

As to the ratio of the space between faces $l_{23}$, of the first and second group constituent lenses to the focal length $f_0$, of the entire projection lens system, there exists the following relationship, as shown in Table 12:

$$0.15 < l_{23}/f_0 < 0.25$$

In order to ensure a relative illumination while maintaining the focusing performance, it is necessary to satisfy the following relationship:

$$0.15 < l_{23}/f_0$$

But the following relatinship is desired because as the above ratio becomes higher, the quantity of light in the middle area of the picture plane tends to decrease:

$$l_{23}/f_0 < 0.25$$

Further, as to the ratio of the space between faces $l_{23}$, of the first and second group constituent lenses to that $l_{45}$, of the second and third group constituent lenses, the flowing relationship exits, as shown in Table 12:

$$23.0 < l_{23}/l_{45} < 40.0$$

Preferably, the following relationship should be satisfied in order to ensure the marginal thickness of lens while suppressing the amount of sag of the first group-side lens surface of the second group lens 2:

$$l_{23}/l_{45} < 40.0$$

On the other hand, in the case where the brightness of the picture plane center is ensured and the above value is made small, it is necessary to increase the effective aperture of the second group lens 2. For this reason, it is desirable to satisfy the following relationship:

$$23.0 < l_{23}/l_{45}$$

As to the ratio of the space between faces $l_{9,10}$, of the fourth and fifth group constituent lenses to that $L_0$, of the fluorescent face and the third group constituent lens, there exists the following relationship, as shown in Table 13:

$$0.32 < l_{9,10}/L_0 < 0.39$$

In order to increase the quantity of light of the picture plane periphery while maintaining the focusing performance, it is desirable to satisfy the following relationship:

$$l_{9,10}/L_0 < 0.39$$

Further, as to the ratio of the space between faces $l_{7,8}$, of the third and fourth group constituent lenses to the above $l_{9,10}$, the following relationship is satisfied:

$$0.35 < l_{7,8}/l_{9,10} < 0.79$$

For improving the focusing performance, the following relation is desired:

$$0.35 < l_{7,8}/l_{9,10}$$

But a value of the above ratio exceeding 0.79 is not desirable because the relative illumination will be decreased.

Next, as to the shape of the fluorescent face, it is aspherical as shown in Tables 1 to 7, and the center of curvature thereof lies on the screen side. The radius of curvature is larger at the peripheral portion than at the central portion.

FIG. 9 illustrates the arrangement of conventional optical parts of a projection type television, which parts comprise a turn-up mirror 14, projection lenses 15, a cathode-ray tube 16 and a screen 13.

In the projection lens device of the present invention, the focal length in 45-inch projection is 787.6 mm and that in 50-inch projection is 790.0 mm, and thus are sufficiently short. And as shown in FIG. 9, with only one turn-up mirror, it is possible to attain a compact construction of the set.

The characteristics have been described above based on the lens data of the present invention. Effects of the present embodiment are now explained specifically.

Figure 24:
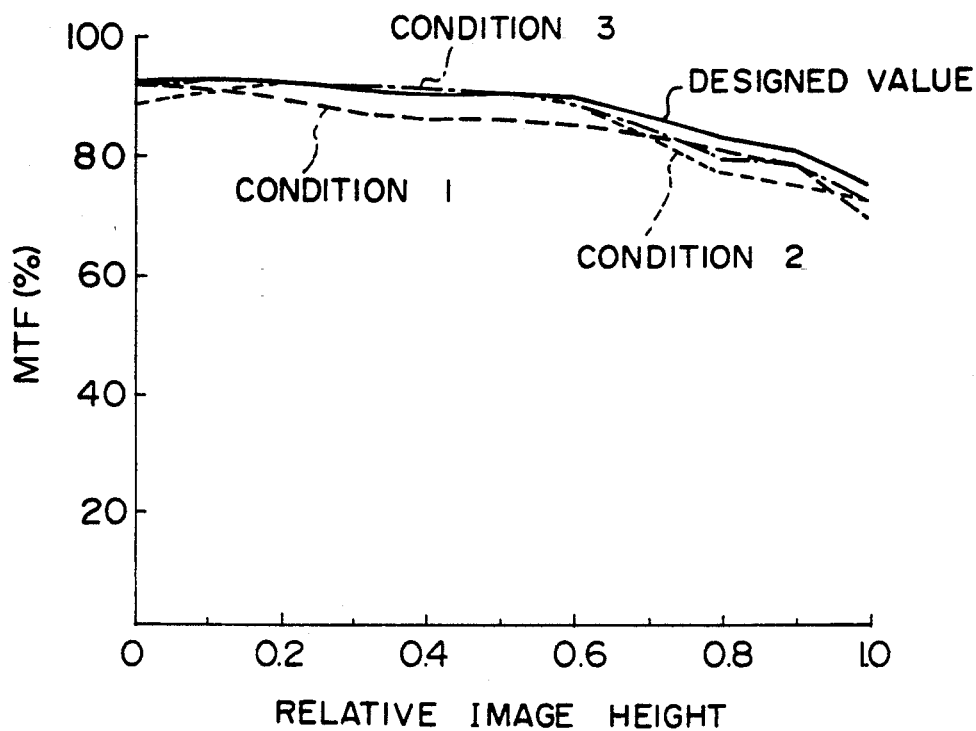
FIGS. 24 and 25 show MTF characteristic to a change of lens shape in the projection lens device in one embodiment of the present invention.
Figure 25:
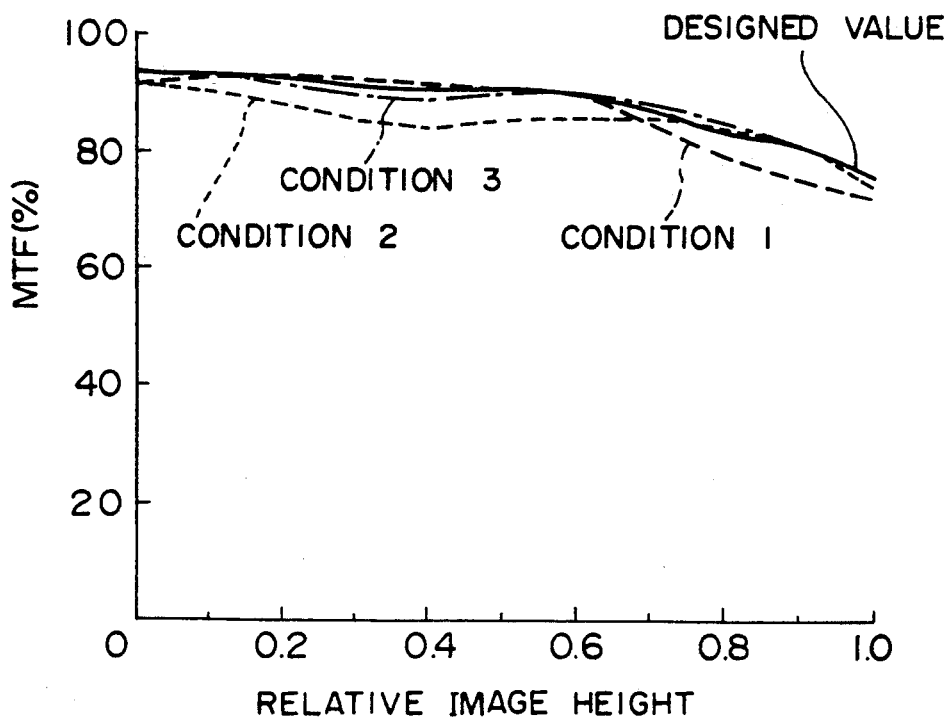

FIGS. 24 and 25 are characteristic diagrams showing the changes in the MTF characteristic of 300 TV lines when the lens shape is changed by expanding 0.1% and contracting 0.1% only the first group lens only, the second group lens singly and the first group lens and the second group lens simultaneously in the projection lens device (whose lens data is shown in Tables 2(A), (B)) as one embodiment of the present invention shown in FIG. 1.

In those figures, averages of meridional and sagittal MTF's are calculated in their image heights and they are plotted. In those figures, a condition 1 is for change of only the first group lens 1 and a condition 2 is for change of only the second group lens 2. A condition 3 is for the simultaneous expansion or contraction of both the first group lens 1 and the second group lens 2.

It is seen from those figures that in the present embodiment the reduction of the focusing performance caused by the change of shape of the lens surface due to the expansion or contraction is cancelled out by the changes of shape of the first group lens 1 and the second group lens 2.

Figure 26:
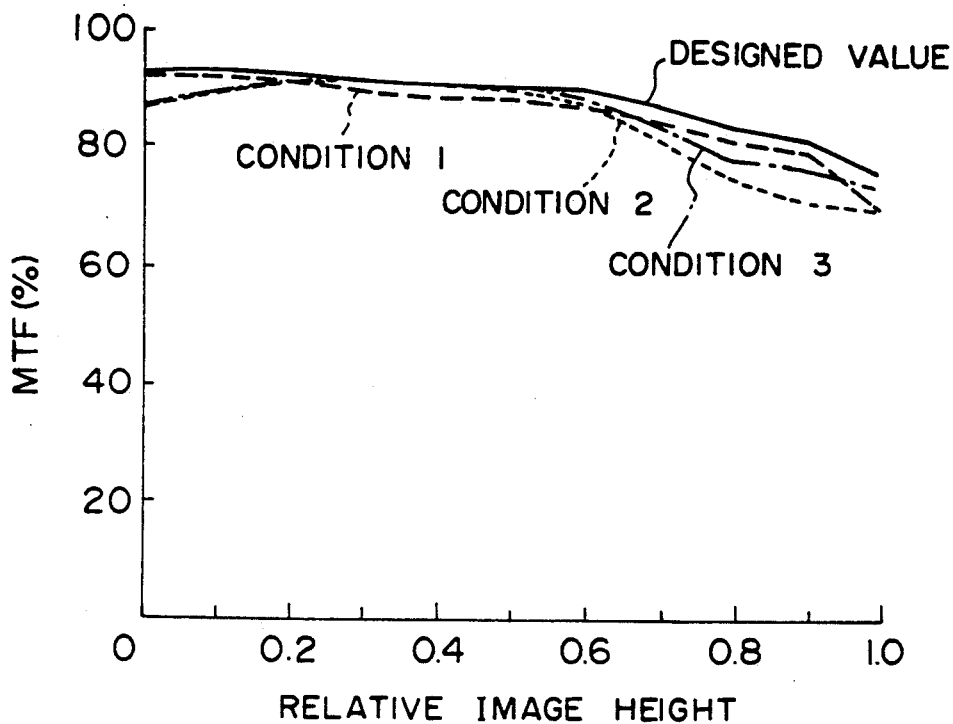
FIGS. 26 and 27 show MTF characteristics to a change of refractive power of a lens caused by a temperature change of the projection lens device in one embodiment of the present invention.
Figure 27:
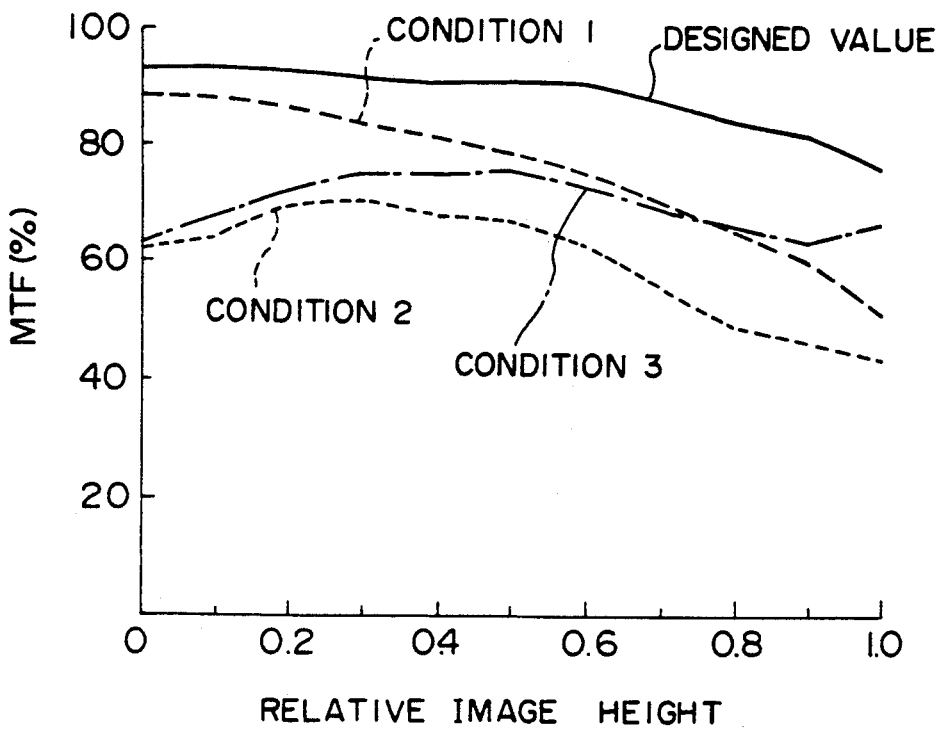

FIGS. 26 and 27 are characteristic diagrams showing the changes in the MTF characteristic of 300 TV lines for the change of refractive index of the lens caused b the temperature lens in the same embodiment as that described above. In those figures, averages of meridional and sagittal MTF's are calculated in their image heights and they are plotted.

FIG. 26 is the characteristic diagram measured when the lens temperature is 40° C., and FIG. 27 is the characteristic diagram measured when the lens temperature is 65° C.

In those figures, a condition 1 is for change of only the first group lens 1, and a condition 2 is for change of only the second group lens 2. A condition 3 is for the simultaneous change of the refractive indices of the first group lens 1 and the second group lens 2.

In those figures, the reduction of the focusing performance is largest under the condition 2, that is, when the refractive index of only the second group lens is changed. It is also seen that like the reduction of the focusing performance by the expansion and contraction of the lens, the reduction of the focusing performance is cancelled out under the condition 3, that is, the refractive indices of the first group lens 1 and the second group lens 2 are simultaneously changed.

In the projection lens device of the present embodiment, the reduction of the focusing performance due to the temperature and humidity is cancelled out by the lens shape of at least two plastic aspherical lenses of the constituent lenses.

Specific means for forcibly deforming the lens by changing the temperature or humidity while binding the plastic lens in the projection lens device is now explained with reference to FIGS. 28 and 29.

Figure 28:
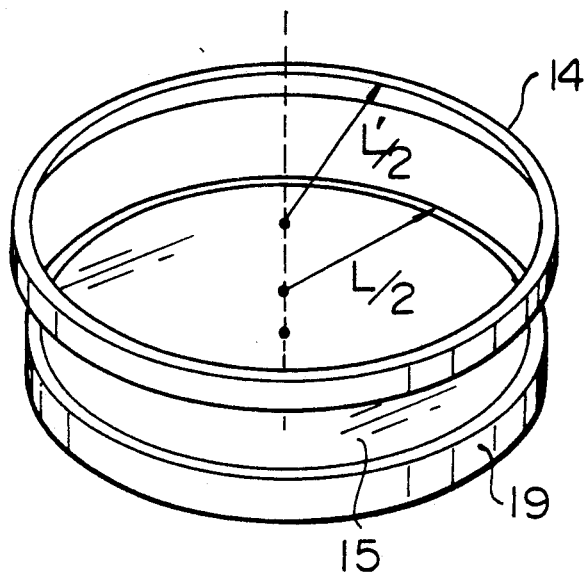
FIGS. 28 and 29 show perspective views of lens binding means.

FIG. 28 shows a perspective view of binding means. In the figure, numeral 14 denotes a ring, numeral 15 denotes a plastic lens and numeral 19 denotes a cova.

In FIG. 28, the ring 14 made of a material having a higher rigidity than plastic is fitted to the cova 19 (flat outer edge portion supported by a bodytube) other than an effective diameter area of the plastic lens 15. Alternatively, the ring 14 may be injection-molded. By keeping a relationship of $$L' < (1.001 \times L)$$

where L is an outer diameter of the plastic lens 15 in a dry state and L' is an inner diameter of the ring 14, a practical binding force is attained so that a desired amount of deformation is attained. The above formula takes the expansion of approximately 0.17 into consideration.

The above binding means was applied to the first group lens 1 and the second group lens 2 of the embodiment shown in FIG. 1. It was confirmed that the first group lens 1 was deformed toward the screen and the second group of lens 2 was deformed to the CRT by the expansion by the humidity absorption, and the local lens functions described above were enhanced by the same extent.

In the present embodiment, the two plastic aspherical lenses are combined such that the lens surface of the first group lens 1 facing the screen is convex toward the screen at the center and concave at the periphery, and the second group lens 2 has the weak positive refractive power at the center and stronger positive refractive power at the periphery. The same effect may be attained by the same binding means for different lens shapes or the opposite direction of deformation.

Figure 29:
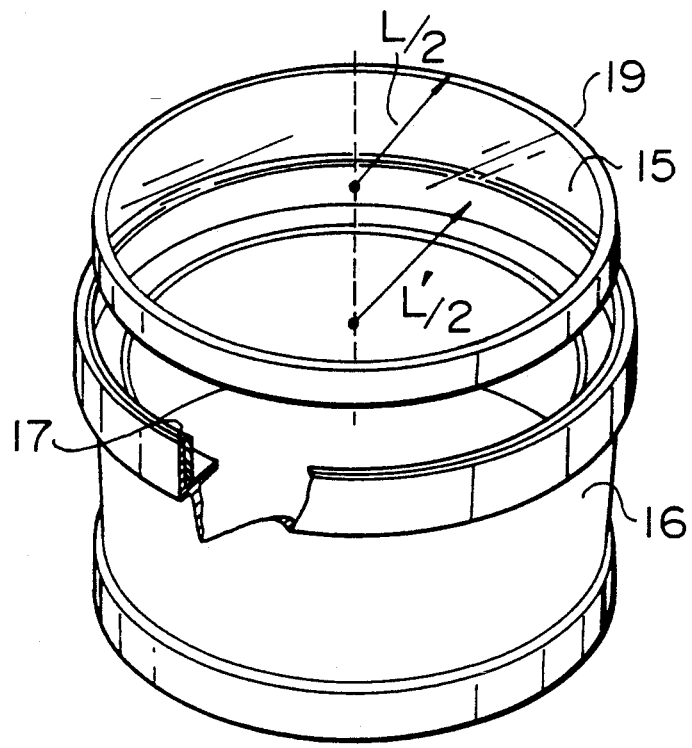

FIG. 29 shows a perspective view of another embodiment of the binding means. In the figure, numeral 16 denotes a lens bodytube and numeral 17 denotes a ring.

FIG. 29 is shown as a partial broken view to more clearly illustrate the construction. The ring 17 made of a material having a higher rigidity than plastic is fitted to the cova 19 of the plastic lens 15 of the bodytube 16. Alternatively, the ring 17 may be insertionmolded to form a similar bodytube.

By keeping a relationship of $$L' < (1.001 \times L)$$

where L is an outer diameter of the plastic lens 15 in a dry state and L' is an inner diameter of the ring 17, a practical binding force is attained and a desired amount of deformation is attained.

On the other hand, depending on the shape of the plastic lens, a better cancellation effect may be attained by the expansion without binding rather than the forced deformation of the plastic lens while it is bound. Specific means for non-binding is explained with reference to FIGS. 30 and 31.

Figure 30:
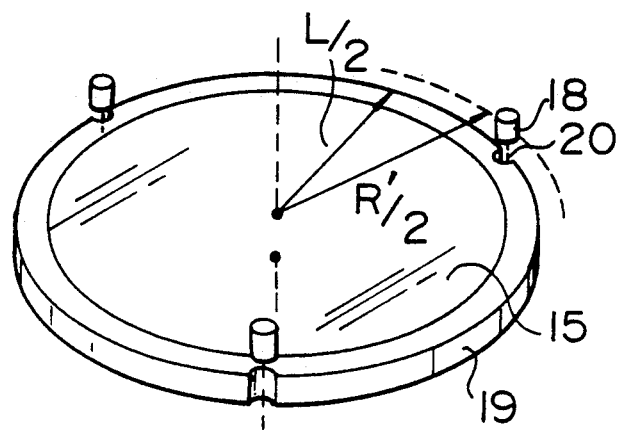
FIGS. 30 and 31 shows perspective views of lens non-binding means.

FIG. 30 shows a perspective view of means for non-binding the plastic lens when it is expanded. In the figure, numeral 18 denotes a resilient member and numeral 20 denotes a notch.

In FIG. 30, the cova 19 is provided in the area other than the effective diameter area of the plastic lens 15, and a portion thereof is cut away to form the notch 20 to secure the resilient member 18. The resilient member 18 is fitted to the notch 20 and secured thereto. Alternatively, the resilient member 18 may be injection-molded to form a similar lens.

In the above arrangement, even if the plastic lens 15 expands, only the resilient member 18 deforms and the plastic lens 15 is not bound by the bodytube 16. By keeping a relationship of $$R' < (1.001 \times L)$$

wherein L is an outer diameter of the plastic lens 15 in a dry state and R'/2 is a distance from a radial outerpost point of the resilient member 18 to the center of lens, a desired effect is attained. In the present embodiment, three notches are formed although more notches may be formed to attain the same effect.

A partial lens function was most effectively cancelled out when the above means are applied to the second group lens 2 of the embodiment of FIG. 1 and the binding means described above was applied to the first group lens 1.

In one projection lens device, the bound plastic lens and the non-bound plastic lens may be mixedly used to attain the effective cancellation.

Figure 31:
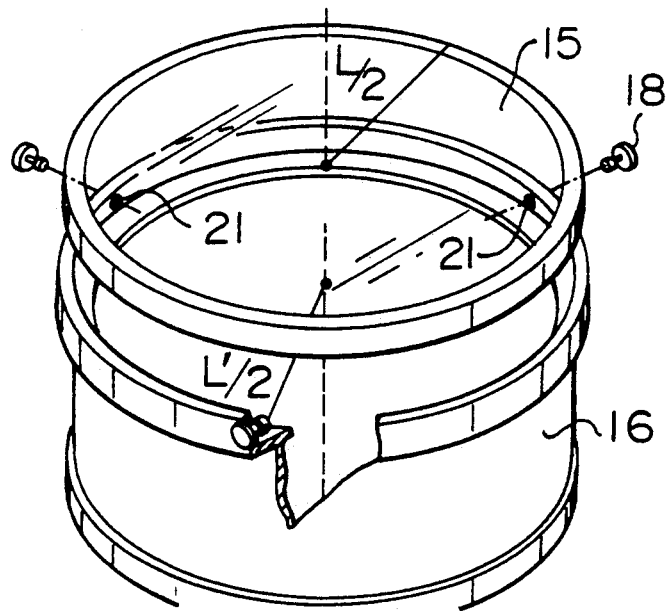

FIG. 31 shows a perspective view of an other embodiment of the non-binding means. In the figure, numeral 21 denotes a securing hole.

FIG. 31 is shows as a partial broken view to more clearly illustrate the constructions, three or more securing holes 21 are formed in an area of the bodytube 16 which radially receive the plastic lens 15, and the resilient members 18 are fitted and fixed to the securing holes 21. The resilient members 18 one fixed in position so that they are not removed once they are inserted. In the mount position to the bodytube, portions of the resilient members 18 project from the inner wall surface of the bodytube so that the plastic lens 15 is supported and fixed by the ends of the projected portions.

In the above arrangement, even if the plastic lens 15 expands, only the resilient members 18 deform and the plastic lens 15 is not bound by the bodytube 16. By keeping a relationship of $$D < (1.001 \times L)$$

where L is an outer diameter of the plastic lens in a dry state and D is a diameter of an inscribed circle of connecting apexes of the projected portions of the resilient members 18 projecting from the bodytube 16, a desired effect is attained.

In the present embodiment, three resilient member securing holes 21 are formed in the bodytube 16 to hold and fix the plastic lens 15 by the resilient member in the three directions, although the same effect may be attained when it is held in more than three directions.

TABLE 1(A)

| | | Radius of curvature $R_D$ | Space between faces | Abbe's number $v_d$ / Refractive index |
|---|---|---|---|---|
| Spherical system | Screen | ∞ | 787.60 | 1.0 |
| First lens | $S_1$ | 97.999 | 8.874 | 57.9 / 1.49334 |
| | $S_2$ | 188.61 | 19.0 | 1.0 |
| Second lens | $S_3$ | −189.80 | 9.20 | 57.0 / 1.49334 |
| | $S_4$ | −160.57 | 0.8223 | 1.0 |
| Third lens | $S_5$ | 73.028 | 31.00 | 60.3 / 1.62280 |
| | $S_6$ | −100.0 | 2.40 | 25.7 / 1.79174 |
| | $S_7$ | −298.27 | 12.20 | 1.0 |
| Fourth lens | $S_8$ | 18188.0 | 9.1432 | 57.9 / 1.49334 |
| | $S_9$ | −198.57 | 30.906 | 1.0 |
| Fifth lens | $S_{10}$ | −52.60 | 3.4048 | 57.9 / 1.49334 |
| | $S_{11}$ | −50.774 | 12.00 | 1.44464 |
| Transparent medium | | | | |
| CRT | Face | ∞ | | |

TABLE 1(A)-continued

| | | Radius of curvature $R_D$ | Space between faces | Abbe's number $v_d$ / Refractive index |
|---|---|---|---|---|
| Panel | surfce Fluorescent face $P_1$ | −341.28 | 13.40 | 1.53983 |

TABLE 1(B)

| | | CC | AE | AF | AG | AH |
|---|---|---|---|---|---|---|
| Aspherical system | | | | | | |
| First lens | $S_1$ | −22.091248 | $7.1452882 \times 10^{-7}$ | $-1.6251140 \times 10^{-9}$ | $4.8222738 \times 10^{-13}$ | $-4.2599762 \times 10^{-17}$ |
| | $S_2$ | 2.1841469 | $-1.3045701 \times 10^{-6}$ | $4.1991921 \times 10^{-10}$ | $-1.816426 \times 10^{-13}$ | $3.6866791 \times 10^{-17}$ |
| Second lens | $S_3$ | 11.628045 | $2.2424447 \times 10^{-6}$ | $7.1262640 \times 10^{-10}$ | $-2.9057843 \times 10^{-13}$ | $3.4258433 \times 10^{-17}$ |
| | $S_4$ | 7.8451805 | $1.8531955 \times 10^{-6}$ | $9.786584 \times 10^{-11}$ | $-9.7439316 \times 10^{-15}$ | $-7.0563651 \times 10^{-18}$ |
| Fourth lens | $S_8$ | 198426.56 | $-9.8393516 \times 10^{-9}$ | $-3.2923198 \times 10^{-10}$ | $2.0638499 \times 10^{-13}$ | $-1.8752912 \times 10^{-17}$ |
| | $S_9$ | 10.558845 | $8.3145824 \times 10^{-7}$ | $3.0054714 \times 10^{-10}$ | $-1.7884294 \times 10^{-13}$ | $1.7736483 \times 10^{-16}$ |
| Fifth lens | $S_{10}$ | −0.93910939 | $-3.6342744 \times 10^{-6}$ | $1.6067425 \times 10^{-9}$ | $-1.0267507 \times 10^{-12}$ | $1.7319606 \times 10^{-16}$ |
| | $S_{11}$ | 0 | 0 | 0 | 0 | 0 |
| Fluorescent face $P_1$ | | $4.5\text{-}813494$ | $-2.3355796 \times 10^{-7}$ | $1.182420 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)\, r^2/R_D^2}} + AE \cdot r^4 + AF \cdot r^6 + AG \cdot r^8 + AH \cdot r^{10}$$

TABLE 2(A)

| | | Radius of curvature $R_D$ | Space between faces | Abbe's number $v_d$ / Refractive index |
|---|---|---|---|---|
| Spherical system | Screen | ∞ | 786.09 | 1.0 |
| First lens | $S_1$ | 97.898 | 8.874 | 57.9 / 1.49334 |
| | $S_2$ | 201.54 | 19.20 | 1.0 |
| Second lens | $S_3$ | −189.80 | 9.20 | 57.0 / 1.49334 |
| | $S_4$ | −164.33 | 0.82227 | 1.0 |
| Third lens | $S_5$ | 73.028 | 31.00 | 60.3 / 1.62280 |
| | $S_6$ | −100.00 | 2.80 | 25.7 / 1.79174 |
| | $S_7$ | −297.28 | 11.55 | 1.0 |
| Fourth lens | $S_8$ | 18535.0 | 9.1432 | 57.9 / 1.49334 |
| | $S_9$ | −202.69 | 30.916 | 1.0 |
| Fifth lens | $S_{10}$ | −51.60 | 3.4048 | 57.9 / 1.49334 |
| | $S_{11}$ | −50.744 | 12.0 | 1.44704 |
| Transparent medium | | | | |
| CRT Panel | Face surfce Fluorescent face $P_1$ | ∞ / −341.28 | 13.4 | 1.56232 |

TABLE 2(B)

| | | CC | AE | AF | AG | AH |
|---|---|---|---|---|---|---|
| Aspherical system | | | | | | |
| First lens | $S_1$ | −21.757858 | $7.8059867 \times 10^{-7}$ | $-1.6734467 \times 10^{-9}$ | $4.9568395 \times 10^{-13}$ | $-4.4030546 \times 10^{-17}$ |
| | $S_2$ | 1.8226805 | $-1.1736920 \times 10^{-6}$ | $2.8199776 \times 10^{-10}$ | $-1.2657909 \times 10^{-13}$ | $2.9256730 \times 10^{-17}$ |
| Second lens | $S_3$ | 11.628045 | $2.2424447 \times 10^{-6}$ | $7.1262640 \times 10^{-10}$ | $-2.9057843 \times 10^{-13}$ | $3.4258433 \times 10^{-17}$ |
| | $S_4$ | 8.2492800 | $1.8692099 \times 10^{-6}$ | $1.1006809 \times 10^{-10}$ | $-1.7168477 \times 10^{-14}$ | $-6.9937385 \times 10^{-18}$ |
| Fourth lens | $S_8$ | −1526492.0 | $6.8125757 \times 10^{-8}$ | $-1.8742341 \times 10^{-11}$ | $-4.7460350 \times 10^{-14}$ | $3.9284978 \times 10^{-17}$ |
| | $S_9$ | −2.1682653 | $8.2290740 \times 10^{-7}$ | $2.9138381 \times 10^{-10}$ | $-1.8344966 \times 10^{-13}$ | $1.5523226 \times 10^{-16}$ |
| Fifth lens | $S_{10}$ | −5.5269060 | $-6.6142075 \times 10^{-6}$ | $2.2172029 \times 10^{-9}$ | $-7.4832480 \times 10^{-13}$ | $1.7553964 \times 10^{-17}$ |
| | $S_{11}$ | 0 | 0 | 0 | 0 | 0 |
| Fluorescent face $P_1$ | | 4.5-813494 | $-2.3355796 \times 10^{-7}$ | $1.1824200 \times 10^{-10}$ | $-1.4486896 \times 10^{-14}$ | $5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 3(A)

| | | Radius of curvature $R_D$ | Space between faces | Abbe's number $\nu_d$ / Refractive index |
|---|---|---|---|---|
| Spherical system | Screen | ∞ | | |
| | | | 790.0 | 1.0 |
| First lens | $S_1$ | 90.538 | | |
| | | | 8.874 | 30.3 / 1.58890 |
| | $S_2$ | 132.56 | | |
| | | | 18.890 | 1.0 |
| Second | $S_3$ | −395.96 | | |
| lens | | | 9.5 | 57.9 / 1.49334 |
| | $S_4$ | −121.26 | | |
| | | | 0.5 | 1.0 |
| Third lens | $S_5$ | 80.340 | | |
| | | | 28.5 | 60.3 / 1.62280 |
| | $S_6$ | −7000.0 | | |
| | | | 12.692 | 1.0 |
| Fourth lens | $S_7$ | 409.26 | | |
| | | | 7.2957 | 57.9 / 1.49334 |
| | $S_8$ | −305.62 | | |
| | | | 27.836 | 1.0 |
| Fifth lens | $S_9$ | −52.317 | | |
| | | | 3.3421 | 57.9 / 1.49334 |
| | $S_{10}$ | −50.132 | | |
| | | | 12.00 | 1.44464 |
| Transparent medium | | | | |
| CRT Panel | Face surface | ∞ | | |
| | Fluorescent face $P_1$ | −341.28 | 13.4 | 1.53983 |

TABLE 3(B)

| | | CC | AE | AF | AG | AH |
|---|---|---|---|---|---|---|
| Aspherical system | | | | | | |
| First lens | $S_1$ | −16.197183 | $1.1491170 \times 10^{-6}$ | $-2.4727174 \times 10^{-9}$ | $8.1388013 \times 10^{-13}$ | $-8.0439262 \times 10^{-17}$ |
| | $S_2$ | 5.1115932 | $-8.8967122 \times 10^{-7}$ | $-8.8755521 \times 10^{-10}$ | $4.2184259 \times 10^{-13}$ | $-6.7878695 \times 10^{-17}$ |
| Second lens | $S_3$ | 34.294391 | $1.2839024 \times 10^{-6}$ | $5.5437765 \times 10^{-10}$ | $-1.2751304 \times 10^{-13}$ | $-4.5822250 \times 10^{-18}$ |
| | $S_4$ | −1.2040746 | $5.7451963 \times 10^{-7}$ | $-9.2368711 \times 10^{-11}$ | $1.4119760 \times 10^{-13}$ | $-3.8408993 \times 10^{-17}$ |
| Fourth lens | $S_7$ | −124.71466 | $1.4982927 \times 10^{-6}$ | $-2.4047198 \times 10^{-10}$ | $1.0682642 \times 10^{-12}$ | $-6.6120374 \times 10^{-16}$ |
| | $S_8$ | −34.169188 | $2.1471051 \times 10^{-6}$ | $-1.3431777 \times 10^{-11}$ | $1.2647815 \times 10^{-13}$ | $-6.7387725 \times 10^{-16}$ |
| Fifth lens | $S_9$ | 0.44327094 | $-2.1713278 \times 10^{-6}$ | $1.9994730 \times 10^{-9}$ | $-1.4895250 \times 10^{-12}$ | $6.0904636 \times 10^{-16}$ |
| | $S_{10}$ | 0 | 0 | 0 | 0 | 0 |
| Fluorescent face $P_1$ | | 4.-5813494 $\times 10^{-7}$ | $-2.3355796$ / $1.182420 \times 10^{10}$ | $-1.4486896 \times 10^{-14}$ | $5.5873481 \times 10^{-19}$ | |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 3(C)

| | | Radius of curvature $R_D$ | Space between faces | Abbe's number $\nu_d$ / Refractive index |
|---|---|---|---|---|
| Spherical system | Screen | ∞ | | |
| | | | 790.0 | 1.0 |
| First lens | $S_1$ | 90.538 | | |
| | | | 8.874 | 30.3 / 1.58890 |
| | $S_2$ | 132.56 | | |
| | | | 18.89 | 1.0 |
| Second lens | $S_3$ | −395.96 | | |
| | | | 9.5 | 57.9 / 1.49334 |
| | $S_4$ | −121.26 | | |
| | | | 0.5 | 1.0 |
| Third | $S_5$ | 80.34 | | |

TABLE 3(C)-continued

| | | Radius of curvature $R_D$ | Space between faces | Abbe's number $v_d$ / Refractive index |
|---|---|---|---|---|
| | lens | | 27.00 | 60.3 / 1.62280 |
| | $S_6$ | −75.0 | | |
| | | | 1.5 | 36.3 / 1.62399 |
| | $S_7$ | −7000.0 | | |
| | | | 12.692 | 1.0 |
| Fourth lens | $S_8$ | 409.26 | | |
| | | | 7.2957 | 57.9 / 1.49334 |
| | $S_9$ | −305.62 | | |
| | | | 27.911 | 1.0 |
| Fifth lens | $S_{10}$ | −52.317 | | |
| | | | 3.3421 | 57.9 / 1.49334 |
| | $S_{11}$ | −50.132 | | |
| | | | 12.00 | 1.44464 |

TABLE 3(A)-continued

| | | Radius of curvature $R_D$ | Space between faces | Abbe's number $v_d$ / Refractive index |
|---|---|---|---|---|
| | $S_8$ | −301.02 | | |
| | | | 27.696 | 1.0 |
| Fifth lens | $S_9$ | −52.122 | | |
| | | | 3.3421 | 57.9 / 1.49334 |
| | $S_{10}$ | −50.132 | | |
| lens | | | 12.00 | 1.44464 |
| Transparent medium | | | | |
| CRT Panel | Face surface | ∞ | | |
| | Fluorescent face $P_1$ | −341.28 | 13.4 | 1.53983 |

TABLE 4(B)

| | | CC | AE | AF | AG | AH |
|---|---|---|---|---|---|---|
| Aspherical system | | | | | | |
| First lens | $S_1$ | −16.189407 | 1.1498669 × 10⁻⁶ | −2.4753948 × 10⁻⁹ | 8.1308945 × 10⁻¹³ | −8.0043502 × 10⁻¹⁷ |
| | $S_2$ | 5.1602704 | −8.7814749 × 10⁻⁷ | −8.8572238 × 10⁻¹⁰ | 4.2383561 × 10⁻¹³ | −6.9523697 × 10⁻¹⁷ |
| Second lens | $S_3$ | 32.446014 | 1.2892306 × 10⁻⁶ | 5.4255156 × 10⁻¹⁰ | −1.2512788 × 10⁻¹³ | −4.4846432 × 10⁻¹⁸ |
| | $S_4$ | −0.97792351 | 5.5951091 × 10⁻⁷ | −8.8977145 × 10⁻¹¹ | 1.4001040 × 10⁻¹³ | −3.7519788 × 10⁻¹⁷ |
| Fourth lens | $S_7$ | −8.4842262 | 1.3331337 × 10⁻⁶ | −2.5093905 × 10⁻¹⁰ | 1.1400195 × 10⁻¹² | −6.9844876 × 10⁻¹⁶ |
| | $S_8$ | −12.595605 | 2.2209970 × 10⁻⁶ | −1.4163943 × 10⁻¹¹ | 1.2598403 × 10⁻¹² | −6.8300968 × 10⁻¹⁶ |
| Fifth lens | $S_9$ | 0.43685383 | −2.2490422 × 10⁻⁶ | 2.1655113 × 10⁻⁹ | −1.6291118 × 10⁻¹² | 6.570964 × 10⁻¹⁶ |
| | $S_{10}$ | 0 | 0 | 0 | 0 | 0 |
| Fluorescent face $P_1$ | | 4.5-813494 | −2.3355796 × 10⁻⁷ | 1.182420 × 10¹⁰ | −1.4486890 × 10⁻¹⁴ | 5.5873481 × 10⁻¹⁹ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

| Transparent medium | | | | |
|---|---|---|---|---|
| CRT Panel | Face surfce | ∞ | | |
| | Fluorescent face $P_1$ | −341.28 | 13.4 | 1.53983 |

TABLE 3(A)

| | | | Radius of curvature $R_D$ | Space between faces | Abbe's number $v_d$ / Refractive index |
|---|---|---|---|---|---|
| Spherical system | | Screen | ∞ | | |
| | | | | 700.0 | 1.0 |
| | First lens | $S_1$ | 99.546 | | |
| | | | | 8.874 | 30.3 / 1.58890 |
| | | $S_2$ | 132.56 | | |
| | | | | 18.862 | 1.0 |
| | Second lens | $S_3$ | −104.37 | | |
| | | | | 9.5 | 57.9 / 1.49334 |
| | | $S_4$ | −119.97 | | |
| | | | | 0.5 | 1.0 |
| | Third lens | $S_5$ | 80.340 | | |
| | | | | 28.5 | 60.3 / 1.62280 |
| | | $S_6$ | ∞ | | |
| | | | | 12.631 | 1.0 |
| | Fourth lens | $S_7$ | 413.98 | | |
| | | | | 7.2957 | 57.9 / 1.49334 |

TABLE 4(C)

| | | | Radius curvature $R_D$ | Space between faces | Abbe's number $v_d$ / Refractive index |
|---|---|---|---|---|---|
| Spherical system | | Screen | ∞ | | |
| | | | | 790.0 | 1.0 |
| | First lens | $S_1$ | 90.546 | | |
| | | | | 8.874 | 30.3 / 1.58890 |
| | | $S_2$ | 132.65 | | |
| | | | | 18.864 | 1.0 |
| | Second lens | $S_3$ | −404.37 | | |
| | | | | 9.5 | 57.9 / 1.49334 |
| | | $S_4$ | −119.97 | | |
| | | | | 0.5 | 1.0 |
| | Third lens | $S_5$ | 80.340 | | |
| | | | | 26.5 | 60.3 / 1.62280 |
| | | $S_6$ | −75.0 | | |
| | | | | 2.0 | 36.3 / 1.62399 |
| | | $S_7$ | ∞ | | |
| | | | | 12.631 | 1.0 |
| | Fourth lens | $S_8$ | 413.98 | | |
| | | | | 7.2957 | 57.9 / 1.49334 |
| | | $S_9$ | −301.02 | | |
| | | | | 27.771 | 1.0 |
| | Fifth lens | $S_{10}$ | −52.122 | | |
| | | | | 3.3421 | 57.9 / 1.49334 |
| | | $S_{11}$ | −50.132 | | |

TABLE 4(C)-continued

| | | Radius curvature $R_D$ | Space between faces | Abbe's number $v_d$ / Refractive index |
|---|---|---|---|---|
| | | | 12.0 | 1.44464 |
| Transparent medium | | | | |
| CRT Panel | Face surface | ∞ | | |
| | Flouroescent face $P_1$ | −341.28 | 13.4 | 1.53983 |

TABLE 5(A)

| | | Radius curvature $R_D$ | Space between faces | Abbe's number $v_d$ / Refractive index |
|---|---|---|---|---|
| Spherical system | Screen | ∞ | | |
| | | | 790.0 | 1.0 |
| First lens | $S_1$ | 85.726 | | |
| | | | 8.874 | 30.3 / 1.58890 |
| | $S_2$ | 130.12 | | |
| | | | 19.715 | 1.0 |
| Second lens | $S_3$ | −279.36 | | |
| | | | 9.5 | 57.9 / 1.49334 |
| | $S_4$ | −114.17 | | |
| | | | 0.5 | 1.0 |
| Third lens | $S_5$ | 72.267 | | |
| | | | 30.0 | 60.3 / 1.62280 |
| | $S_6$ | 688.79 | | |
| | | | 9.8229 | 1.0 |
| Fourth lens | $S_7$ | 1341.8 | | |
| | | | 7.2957 | 57.9 / 1.49334 |
| | $S_8$ | −203.97 | | |
| | | | 27.984 | 1.0 |
| Fifth lens | $S_9$ | −54.749 | | |
| | | | 3.3421 | 57.9 / 1.49334 |
| lens | $S_{10}$ | −50.132 | | |
| | | | 12.0 | 1.44464 |
| Transparent medium | | | | |
| CRT Panel | Face surface | ∞ | | |
| | Flouroescent face $P_1$ | −341.28 | 13.4 | 1.53983 |

TABLE 5(C)

| | | Radius curvature $R_D$ | Space between faces | Abbe's number $v_d$ / Refractive index |
|---|---|---|---|---|
| Spherical system | Screen | ∞ | | |
| | | | 790.0 | 1.0 |
| First lens | $S_1$ | 85.726 | | |
| | | | 8.874 | 30.3 / 1.58890 |
| | $S_2$ | 130.12 | | |
| | | | 19.715 | 1.0 |
| Second lens | $S_3$ | −279.36 | | |
| | | | 9.5 | 57.9 / 1.49334 |
| | $S_4$ | −114.17 | | |
| | | | 0.5 | 1.0 |
| Third lens | $S_5$ | 72.267 | | |
| | | | 28.5 | 60.3 / 1.62280 |
| | $S_6$ | −75.0 | | |
| | | | 1.5 | 36.30 / 1.62399 |
| | $S_7$ | 688.79 | | |
| | | | 9.8227 | 1.0 |
| Fourth lens | $S_8$ | 1341.8 | | |
| | | | 7.2957 | 57.9 / 1.49334 |
| | $S_9$ | −203.97 | | |
| | | | 27.984 | 1.0'0 |
| Fifth lens | $S_{10}$ | −54.748 | | |
| | | | 3.3421 | 57.9 / 1.49334 |
| | $S_{11}$ | −50.132 | | |
| | | | 12.0 | 1.44464 |
| Transparent medium | | | | |
| CRT Panel | Face surface | ∞ | | |
| | Flouroescent face $P_1$ | −341.28 | 13.4 | 1.53983 |

TABLE 6(A)

| | | Radius curvature $R_D$ | Space between faces | Abbe's number $v_d$ / Refractive index |
|---|---|---|---|---|
| Spherical system | Screen | ∞ | | |
| | | | 790.0 | 1.0 |
| First lens | $S_1$ | 99.371 | | |
| | | | 8.874 | 30.3 / 1.58890 |
| | $S_2$ | 135.02 | | |
| | | | 18.997 | 1.0 |
| Second | $S_3$ | −271.78 | | |

TABLE 5(B)

| Aspherical system | CC | AE | AF | AG | AH |
|---|---|---|---|---|---|
| First lens | | | | | |
| $S_1$ | −15.26860 | $1.1259281 \times 10^{-6}$ | $-2.5413804 \times 10^{-9}$ | $8.2202431 \times 10^{-13}$ | $-7.7196306 \times 10^{-17}$ |
| $S_2$ | 4.9164934 | $-1.3574354 \times 10^{-6}$ | $-7.591547 \times 10^{-10}$ | $3.8837835 \times 10^{-13}$ | $-6.4454178 \times 10^{-17}$ |
| Second lens | | | | | |
| $S_3$ | 21.130920 | $1.2714318 \times 10^{-6}$ | $7.8633122 \times 10^{-10}$ | $-1.4432715 \times 10^{-13}$ | $-1.1645212 \times 10^{-17}$ |
| $S_4$ | −0.87876731 | $6.5197048 \times 10^{-7}$ | $6.4518405 \times 10^{-11}$ | $1.2614812 \times 10^{-13}$ | $-4.7224879 \times 10^{-16}$ |
| Fourth lens | | | | | |
| $S_7$ | −9829.5977 | $9.3400439 \times 10^{-7}$ | $1.3492410 \times 10^{-10}$ | $5.9239457 \times 10^{-13}$ | $-4.5415641 \times 10^{-16}$ |
| $S_8$ | −14.516611 | $1.9059871 \times 10^{-6}$ | $2.5723243 \times 10^{-11}$ | $1.2099115 \times 10^{-12}$ | $-5.7567451 \times 10^{-16}$ |
| Fifth lens | | | | | |
| $S_9$ | 0.36361086 | $-1.7202501 \times 10^{-6}$ | $5.6167071 \times 10^{-10}$ | $-3.2185019 \times 10^{-12}$ | $1.6191711 \times 10^{-16}$ |
| $S_{10}$ | 0 | 0 | 0 | 0 | 0 |
| Fluorescent face $P_1$ | 4.5813494 | $-2.3355796 \times 10^{-7}$ | $1.182420 \times 10^{-10}$ | $-1.4486890 \times 10^{-14}$ | $5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 5(A)

| | | | Radius curvature $R_D$ | Space between faces | Abbe's number $\nu_d$ / Refractive index |
|---|---|---|---|---|---|
| Spherical system | | Screen | ∞ | | |
| | | | | 790.0 | 1.0 |
| | First lens | $S_1$ | 92.496 | | |
| | | | | 8.2061 | 30.3 / 1.58890 |
| | | $S_2$ | 140.26 | | |
| | | | | 12.697 | 1.0 |
| | Second lens | $S_3$ | −407.37 | | |
| | | | | 11.749 | 57.9 / 1.49334 |
| | | $S_4$ | −322.90 | | |
| | | | | 0.5 | 1.0 |
| | Third lens | $S_5$ | 95.176 | | |
| | | | | 21.675 | 60.3 / 1.62280 |
| | | $S_6$ | −172.61 | | |
| | | | | 21.843 | 1.0 |
| | Fourth lens | $S_7$ | 1127.8 | | |
| | | | | 7.2957 | 57.9 / 1.49334 |
| | | $S_8$ | −151.78 | | |
| | | | | 27.984 | 1.0 |
| | Fifth lens | $S_9$ | −51.543 | | |
| | | | | 3.3421 | 57.9 / 1.49334 |
| | lens | $S_{10}$ | −50.132 | | |
| | | | | 12.0 | 1.44464 |
| Transparent medium | | | | | |
| CRT Panel | Face surface | | ∞ | | |
| | Flourescent face $P_1$ | | −341.28 | 13.4 | 1.53983 |

TABLE 6(A)-continued

| | | Radius curvature $R_D$ | Space between faces | Abbe's number $\nu_d$ / Refractive index |
|---|---|---|---|---|
| lens | | | 9.5 | 57.9 / 1.49334 |
| | $S_4$ | −176.11 | | |
| | | | 0.5 | 1.0 |
| Third lens | $S_5$ | 73.877 | | |
| | | | 30.0 | 60.3 / 1.62280 |
| | $S_6$ | −78.00 | | |
| | | | 2.5 | 25.7 / 1.79174 |
| | $S_7$ | −205.90 | | |
| | | | 13.3 | 1.0 |
| Fourth lens | $S_8$ | 516.05 | | |
| | | | 7.2957 | 57.9 / 1.49334 |
| | $S_9$ | −294.53 | | |
| | | | 30.113 | 1.0'0 |
| Fifth lens | $S_{10}$ | −51.543 | | |
| | | | 3.3421 | 57.9 / 1.49334 |
| | $S_{11}$ | −50.132 | | |
| | | | 12.0 | 1.44464 |
| Transparent medium | | | | |
| CRT Panel | Face surface | ∞ | | |
| | Flouroescent face $P_1$ | −341.28 | 13.4 | 1.53983 |

TABLE 6(B)

| Aspherical system | CC | AE | AF | AG | AH |
|---|---|---|---|---|---|
| First lens | | | | | |
| $S_1$ | −17.822083 | $9.6200438 \times 10^{-7}$ | $-2.2860192 \times 10^{-9}$ | $7.5216228 \times 10^{-13}$ | $-7.5183611 \times 10^{-17}$ |
| $S_2$ | 4.3537569 | $-8.8163574 \times 10^{-7}$ | $-9.8732666 \times 10^{-10}$ | $3.8056613 \times 10^{-13}$ | $-4.1792963 \times 10^{-17}$ |
| Second lens | | | | | |
| $S_3$ | −56.912933 | $1.4778507 \times 10^{-6}$ | $2.1591005 \times 10^{-10}$ | $-4.7389959 \times 10^{-14}$ | $1.5920805 \times 10^{-17}$ |
| $S_4$ | −23.624878 | $8.2483166 \times 10^{-7}$ | $-4.2019499 \times 10^{-11}$ | $1.1675746 \times 10^{-13}$ | $-4.8150964 \times 10^{-17}$ |
| Fourth lens | | | | | |
| $S_8$ | 157.41711 | $4.0271578 \times 10^{-7}$ | $1.3190580 \times 10^{-11}$ | $-1.4982471 \times 10^{-13}$ | $4.1693026 \times 10^{-17}$ |
| $S_9$ | −27.295013 | $9.4030571 \times 10^{-7}$ | $4.5176818 \times 10^{-10}$ | $-3.5836557 \times 10^{-13}$ | $1.5429416 \times 10^{-16}$ |
| Fifth lens | | | | | |
| $S_{10}$ | 0.53007919 | $-3.4957948 \times 10^{-6}$ | $3.5448675 \times 10^{-9}$ | $-2.3173867 \times 10^{-12}$ | $7.1377370 \times 10^{-16}$ |
| $S_{11}$ | 0 | 0 | 0 | 0 | 0 |
| Fluorescent face $P_1$ | 4.5813494 | $-2.3355796 \times 10^{-7}$ | $1.182420 \times 10^{-10}$ | $-1.4486896 \times 10^{-14}$ | $5.5873481 \times 10^{-19}$ |

$$Z = \frac{r^2/R_D}{1 + \sqrt{1 - (1 + CC)\, r^2/R_D^2}} + AE \cdot r^4 + AF \cdot r^6 + AG \cdot r^8 + AH \cdot r^{10}$$

TABLE 7(B)

| Aspherical system | CC | AE | AF | AG | AH |
|---|---|---|---|---|---|
| First lens | | | | | |
| $S_1$ | −14.252677 | $8.9568914 \times 10^{-7}$ | $-2.1814219 \times 10^{-9}$ | $7.7891290 \times 10^{-13}$ | $-9.2050459 \times 10^{-17}$ |
| $S_2$ | 5.9230633 | $-7.8229976 \times 10^{-7}$ | $-8.0139340 \times 10^{-10}$ | $5.5336996 \times 10^{-13}$ | $-1.288945 \times 10^{-16}$ |
| Second lens | | | | | |
| $S_3$ | −18.355804 | $7.0309511 \times 10^{-7}$ | $4.1545167 \times 10^{-10}$ | $2.8583947 \times 10^{-14}$ | $-1.0394242 \times 10^{-16}$ |
| $S_4$ | −17.095596 | $2.6480564 \times 10^{-7}$ | $-3.5712502 \times 10^{-11}$ | $6.2280096 \times 10^{-14}$ | $-5.2936423 \times 10^{-17}$ |
| Fourth lens | | | | | |
| $S_7$ | 768.32666 | $-1.7966119 \times 10^{-7}$ | $3.8129366 \times 10^{-10}$ | $9.3625872 \times 10^{-13}$ | $1.6871918 \times 10^{-16}$ |
| $S_8$ | −21.525909 | $-3.2374192 \times 10^{-7}$ | $7.2176332 \times 10^{-10}$ | $-1.1933054 \times 10^{-13}$ | $2.5380283 \times 10^{-16}$ |
| Fifth lens | | | | | |
| $S_9$ | 0.53007919 | $-3.4957948 \times 10^{-6}$ | $3.5448675 \times 10^{-9}$ | $-2.3173867 \times 10^{-12}$ | $7.1377370 \times 10^{-16}$ |
| $S_{10}$ | 0 | 0 | 0 | 0 | 0 |

TABLE 7(B)-continued

| Aspherical system | CC | AE | AF | AG | AH |
|---|---|---|---|---|---|
| Fluorescent face $P_1$ | 4.5813494 | $-2.3355796 \times 10^{-7}$ | $1.182420 \times 10^{-10}$ | $-1.4486890 \times 10^{-14}$ | $5.5873481 \times 10^{-19}$ |

$$Z = \frac{r^2/R_D}{1 + \sqrt{1 - (1 + CC) r^2/R_D^2}} + AE \cdot r^4 + AF \cdot r^6 + AG \cdot r^8 + AH \cdot r^{10}$$

TABLE 8

| Lens No. | | Power distribution of constituent lenses | | | | | Focal length of entire system |
|---|---|---|---|---|---|---|---|
| | | $f_0/f_1$ | $f_0/f_2$ | $f_0/f_3$ | $f_0/f_4$ | $f_0/f_5$ | |
| 1 | | 0.2153 | 0.0450 | 0.8029 | 0.2166 | −0.5655 | 86.24 |
| 2 | | 0.2296 | 0.0388 | 0.8025 | 0.2120 | −0.5777 | 86.16 |
| 3 | (A) | 0.1826 | 0.2345 | 0.6430 | 0.2308 | −0.5417 | 82.13 |
|   | (C) | 0.1827 | 0.2346 | 0.6423 | 0.2309 | −0.5420 | 82.18 |
| 4 | (A) | 0.1829 | 0.2403 | 0.6371 | 0.2318 | −0.5449 | 82.18 |
|   | (C) | 0.1830 | 0.2403 | 0.6363 | 0.2320 | −0.5452 | 82.23 |
| 5 | (A) | 0.2058 | 0.2128 | 0.6423 | 0.2274 | −0.5060 | 81.74 |
|   | (C) | 0.2065 | 0.2135 | 0.6434 | 0.2282 | −0.5078 | 82.02 |
| 6 | | 0.1439 | 0.0857 | 0.8262 | 0.2209 | −0.5669 | 84.20 |
| 7 | | 0.1893 | 0.0272 | 0.8073 | 0.3021 | −0.5526 | 82.08 |

$f_1$: Focal length of the first group
$f_2$: Focal length of the second group
$f_3$: Focal length of the third group
$f_4$: Focal length of the Fourth group
$f_5$: focal length of the fifth group $f_1$: Focal length of the first group
$f_2$: Focal length of the second group
$f_3$: Focal length of the third group
$f_4$: Focal length of the Fourth group
$f_5$: Focal length of the fifth group

TABLE 9

| | | Lens No. | Amount of sag in aspherical system (mm): $A_s$ | Amount of sag spherical system (mm): $S_s$ | $A_s/S_s$ | Clap radius (mm) |
|---|---|---|---|---|---|---|
| First lens | Image-side lens surface $S_1$ | 1 | −0.9715 | 17.5764 | −0.0553 | 56.0 |
| | | 2 | −0.8986 | 17.5985 | −0.0511 | 56.0 |
| | | 3 | 0.0670 | 15.0587 | 0.0443 | 50.0 |
| | | 4 | 0.6382 | 15.0571 | 0.0424 | 50.0 |
| | | 5 | 0.4280 | 16.0916 | 0.0266 | 50.0 |
| | | 6 | −1.0956 | 15.3139 | −0.0715 | 53.0 |
| | | 7 | 9.2798 | 16.6903 | 0.0168 | 53.0 |
| | Object-side lens surface $S_2$ | 1 | 2.1481 | 7.6292 | 0.2816 | 53.1 |
| | | 2 | 1.5801 | 7.1211 | 0.2219 | 53.1 |
| | | 3 | 3.9249 | 8.9958 | 0.4363 | 48.0 |
| | | 4 | 3.9999 | 8.9894 | 0.4450 | 48.0 |
| | | 5 | 2.5527 | 9.1770 | 0.2782 | 48.0 |
| | | 6 | 2.0852 | 10.2076 | 0.2043 | 51.5 |
| | | 7 | 5.0409 | 9.7969 | 0.5145 | 51.5 |

TABLE 10

| | | Lens No. | Amount of sag in aspherical system (mm): $A_s$ | Amount of sag spherical system (mm): $S_s$ | $A_s/S_s$ | Clap radius (mm) |
|---|---|---|---|---|---|---|
| Second lens | Image-side lens surface $S_3$ | 1 | 5.9159 | −6.0399 | −0.9795 | 47.5 |
| | | 2 | 5.9159 | −6.0399 | −0.9795 | 47.5 |
| | | 3 | 2.4288 | −2.0256 | −1.1991 | 40.0 |
| | | 4 | 2.4819 | −1.9832 | −1.2515 | 40.0 |
| | | 5 | 2.1144 | −2.8785 | −0.7345 | 40.0 |
| | | 6 | 4.1429 | −3.9555 | −1.0474 | 46.2 |
| | | 7 | −0.1480 | −2.9215 | 0.0507 | 48.7 |
| | Object-side lens surface $S_4$ | 1 | 0.5107 | −7.4365 | −0.0687 | 48.3 |
| | | 2 | 0.7769 | −7.2583 | −0.1070 | 48.3 |
| | | 3 | −4.9460 | −6.7872 | 0.7287 | 40.0 |
| | | 4 | −5.0804 | −6.8648 | 0.7401 | 40.0 |
| | | 5 | −4.7685 | −7.2364 | 0.6590 | 40.0 |
| | | 6 | −1.0727 | −5.9792 | 0.1794 | 45.5 |

TABLE 10-continued

| Lens No. | Amount of sag in aspherical system (mm): $A_s$ | Amount of sag of sag spherical system (mm): $S_s$ | $A_s/S_s$ | Clap radius (mm) |
|---|---|---|---|---|
| 7 | −4.2128 | −3.6480 | 1.1548 | 48.4 |

TABLE 11

| | | Lens No. | Amount of sag in aspherical system (mm): $A_s$ | Amount of sag spherical system (mm): $S_s$ | $A_s/S_s$ | Clap radius (mm) |
|---|---|---|---|---|---|---|
| Fourth lens | Image-side lens surface $S_8$ | 1 | −0.1445 | 0.044 | −3.2841 | 40.0 |
| | | 2 | 0.2210 | 0.043 | 5.1395 | 40.0 |
| | | 3 | 4.4821 | 1.8817 | 2.3819 | 39.2 |
| | | 4 | 4.4354 | 1.8601 | 2.3845 | 39.2 |
| | | 5 | 2.3887 | 0.5727 | 4.1709 | 39.2 |
| | | 6 | 2.8234 | 1.4910 | 1.8936 | 39.2 |
| | | 7 | 3.5335 | 0.6815 | 5.1849 | 39.2 |
| | Object-side lens surface $S_9$ | 1 | −0.8092 | −3.9481 | 0.2050 | 39.4 |
| | | 2 | −0.3808 | −3.866 | 0.0985 | 39.4 |
| | | 3 | 3.8666 | −2.4601 | −1.5717 | 38.& |
| | | 4 | 3.8427 | −2.4981 | −1.5382 | 38.7 |
| | | 5 | 2.8026 | −3.7050 | −0.7564 | 38.7 |
| | | 6 | 0.6812 | −2.5536 | −0.2668 | 38.7 |
| | | 7 | −0.8928 | −5.0167 | 0.1780 | 38.7 |

TABLE 12

| Lens No. | Focal length of entire system (mm) | Lens spacing $l_{23}$ (mm) | Lens spacing $l_{45}$ (mm) | $l_{23}/f_0$ | $l_{23}/l_{45}$ |
|---|---|---|---|---|---|
| 1 | 86.24 | 19.00 | 0.8223 | 0.2203 | 23.106 |
| 2 | 86.16 | 19.20 | 0.8223 | 0.228 | 23.349 |
| 3 | 82.13 | 18.890 | 0.5 | 0.2300 | 37.78 |
| 4 | 82.18 | 18.862 | 0.5 | 0.2295 | 37.724 |
| 5 | 81.74 | 19.715 | 0.5 | 0.2412 | 39.43 |
| 6 | 84.20 | 18.997 | 0.5 | 0.2256 | 37.994 |
| 7 | 82.08 | 12.697 | 0.5 | 0.1547 | 25.394 |

$l_{23}$: Space between faces of the first and second group constituent lenses.
$l_{45}$: Space between faces of the second and third group constituent lenses.

TABLE 13

| Lens No. | Spacing $L_0$ (mm) | Lens spacing $l_{78}$ (mm) | Lens spacing $l_{910}$ (mm) | $l_{910}/L_0$ | $l_{78}/l_{910}$ |
|---|---|---|---|---|---|
| 1 | 81.05 | 12.20 | 30.906 | 0.3813 | 0.3947 |
| 2 | 80.41 | 11.55 | 30.916 | 0.3845 | 0.3736 |
| 3 | 76.57 | 12.692 | 27.836 | 0.3635 | 0.4560 |
| 4 | 76.36 | 12.631 | 27.696 | 0.3627 | 0.4561 |
| 5 | 73.84 | 9.8229 | 27.984 | 0.3790 | 0.3510 |
| 6 | 79.45 | 13.30 | 30.113 | 0.3790 | 0.4417 |
| 7 | 85.86 | 21.843 | 27.984 | 0.3259 | 0.7806 |

$l_{78}$: Space between faces of the third and fourth group constituent lenses.
$l_{910}$: Space between faces of the fourth and fifth group constituent lenses.

$L_0$: Space between faces of the fluorescent face and the third group constituent lens.

In accordance with the present invention, the reduction of the focusing performance for the change of temperature and humidity is cancelled even for a large diameter projection lens device by the shapes of at least two plastic aspherical lenses in the projection lens device.

Further, the following effects are attained.

(1) Since no concave lens is arranged on the screen side of the lens having the positive refractive power in the projection lens system, the distortion aberration and the astigmatism can be compensated even if the field angle is wide and the high focusing performance and the wide field angle are compatible.

(2) Since no concave lens is arranged as described above, the light from the periphery of the view field is not diversed accordingly, the light ray height may be low and a high peripheral light intensity ratio is attained.

The means for binding the movement of the lens is provided at the area (cova) other than the effective diameter area of the plastic aspherical lens to forcibly deform the shape of the partial lens by the expansion due to the change of temperature and humidity in order to enhance the cancellation effect.

Depending on the material and the shape of the lens, hold means without the binding force may be required. The plastic lens and the bodytube of the present invention attain the above holding.

We claim:

1. A projection lens device having at least two plastic lenses for magnification-projecting an original image displayed on a display screen onto a screen;

one lens of said two plastic lenses is convex at a center thereof toward the screen and concave at a periphery thereof, and the other lens of said two plastic lenses has a weak positive refractive power toward the screen at a center thereof and a stronger refractive power at a periphery thereof;

whereby a variation of a lens power due to a change of surrounding environment is cancelled out by the concave shape at the periphery of said one lens and the positive refractive power at the periphery of said other lens.

2. A projection lens device according to claim 1 wherein said one lens is arranged closer to the screen than said other lens.

3. A projection lens device according to claim 1 wherein said other lens meets a relationship of $$|Rs| > |Rb|$$

where Rs is a radius of curvature of a lens surface facing the screen, and Rb is a radius of curvature of a lens surface facing the display screen.

4. A projection lens device according to claim 1 or 2 wherein said one lens is a plastic lens which is convex toward the screen at a center thereof and concave at a periphery thereof, and arranged most closely to the screen among the lenses of said projection lens device.

5. A projection lens device according to claim 3 wherein a lens surface of said other lens faces the display screen and a group of lenses which share most of a positive refractive power of an entire system of lenses of said projection lens device are arranged to face the lens surface of said other lens facing the display screen.

6. A projection lens device for magnificationprojecting an original image displayed on a display screen onto a screen, comprising in sequence from the screen to the display screen, a first group of lenses including a plastic lens which is convex toward the screen at a center thereof and concave at a periphery thereof;

a second group of lenses having a weak positive refractive power toward the screen at a center thereof and a stronger positive refractive power at a periphery thereof;

a third group of lenses including a lens which shares most of a positive refractive power of an entire system of the projection lens device having a plurality of groups of lenses;

a fourth group of lenses having a relatively weak refractive power; and a fifth group of lenses including a negative lens which is concave toward the screen.

7. A projection lens device according to claim 6 wherein the projection lens device meets a relationship of $$0.14 < f_p/f_1 < 0.25$$

$$0.02 < f_0/f_2 < 0.25$$

$$0.63 < f_0/f_3 < 0.83$$

where
$f_0$: focal length of the entire lens system including a phosphor face of the display screen
$f_1$: focal length of the first lens group
$f_2$: focal length of the second lens group
$f_3$: focal length of the third lens group.

8. A five-group projection lens device comprising in sequence from a screen;

a first group including at least one lens which is convex toward the screen and has at least one surface which is convex toward the screen at a center thereof and concave at a periphery thereof;

a second group including at least one lens having a relatively weak refractive power;

a third group including at least one lens having most of a positive refractive power of an entire system;

a fourth group including at least one lens having a relatively weak refractive power; and a fifth group including at least one negative lens which is concave toward the screen.

9. A five-group projection lens device comprising in sequence from a screen;

a first group including at least one lens which is convex toward the screen and has at least one surface which is convex toward the screen at a center thereof and concave at a periphery thereof;

a second group including at least one lens having a relatively weak refractive power;

third group including at least one lens having most of a positive refractive power of an entire system;

a fourth group including at least one lens having a relatively weak refractive power; and a fifth group including at least one negative lens which is concave toward the screen, said first to fifth group meeting a relationship of $$0.14 < f_0/f_1 < 0.23$$

$$0.02 < f_0/f_2 < 0.25$$

$$0.63 < f_0/f_3 < 0.83$$

$0.21 < f_0/f_4 < 0.31$ $-0.57 < f_0/f_5 < -0.50$ where
- $f_0$: focal length of the entire lens system
- $f_1$: focal length of the first lens group
- $f_2$: focal length of the second lens group
- $f_3$: focal length of the third lens group
- $f_4$: focal length of the fourth lens group
- $f_5$: focal length of the fifth lens group.

10. A projection lens device according to claim 9, wherein the constituent lens elements of said first, second, fourth and fifth groups are aspherical at least at one surface thereof.

11. A projection lens device according to claim 9 or 10, wherein the lens surface of at least one constituent lens element of said first group which face the screen has an amount of asphericity which meets the following relationship, assuming that the amount of asphericity is given by $A_s/S_s$:

$-0.1 < A_2/S_s$ where
- $A_s$: amount of aspherical sag
- $S_s$: amount of spherical sag.

12. A projection lens device according to claim 10, wherein the lens surface of at least one constituent lens of said first group which faces the second group lens has an amount of asphericity which meets the following relationship assuming that the amount of asphericity is given by $A_s/S_s$ $0.2 < A_s/S_s$ where
- $A_s$: amount of aspherical sag
- $S_s$: amount of spherical sag.

13. A projection lens device according to claim 9 or 10, wherein the lens surface of at least one constituent lens of said second group which faces the first group lens has an amount of asphericity which meets the following relationship, assuming that the amount of asphericity is given by $A_s/S_s$:

$-1.3 < A_s/S_s$ where
- $A_s$: amount of aspherical sag
- $S_s$: amount of spherical sag.

14. A projection lens device according to claim 9 or 10, wherein the lens surface of at least one constituent lens element of said second group which faces the third group lens has an amount of asphericity which meets the following relationship, assuming that the amount of asphericity is given by $A_s/S_s$:

$-0.15 < A_s/S_s$ where
- $A_s$: amount of aspherical sag
- $S_s$: amount of spherical sag.

15. A projection lens device according to claim 9 or 10, wherein the lens surface of at least one constituent lens of said fourth group which faces the third group lens has an amount of asphericity which meets the following relationship, assuming that the amount of asphericity is given by $A_s/S_s$:

$-3.3 < A_s/S_s$ where
- $A_s$: amount of aspherical sag
- $S_s$: amount of spherical sag.

16. A projection lens device according to claim 9 or 10, wherein the lens surface of at least one constituent lens of said fourth group which faces the fifth group lens has an amount of asphericity which meets the following relationship, assuming that the amount of asphericity is given by $A_s/S_s$:

$-1.6 < A_s/S_s$ where
- $A_s$: amount of aspherical sag
- $S_s$: amount of spherical sag.

17. A projection lens device according to claim 9, wherein the space $l_{23}$ between faces, of the constituent lenses of said first and second groups meets the following relationship to a focal length $f_0$, of the entire lens system:

$0.15 < l_{23}/f_0$

18. A projection lens device according to claim 9 or 10, wherein the ratio $l_{23}/l_{45}$ of the space between faces of the constituent lenses of said first and second groups to the space $l_{45}$ between faces, of the constituent lenses of said second and third groups meets a relationship of:

$20 < l_{23}/l_{45}$

19. A projection lens device according to claim 9, wherein the ratio $l_{910}/L_0$ of the space $l_{910}$ between faces, of the constituent lenses of said fourth and fifth groups to the space $L_0$ between faces, of the fluorescent face of a cathode-ray tube which constitutes said fifth group and the constituent lens of said third group meets a relationship of:

$l_{910}/L_0 < 0.40$

20. A projection lens device according to claim 9 or 19, wherein the ratio $l_{78}/l_{910}$ of the space $l_{78}$ between faces, of the constituent lenses of said third and fourth groups to the space $l_{910}$ between faces, of the constituent lenses of said fourth and fifth groups meets a relationship of:

$0.3 < l_{78}/l_{910}$

21. A projection lens device comprising, in sequence from a screen:
- a first group including at least one lens which is convex toward the screen and has at least one surface which is convex toward the screen at a center thereof and concave at a periphery thereof;
- a second group including at least one lens having a relatively weak refractive power;
- a third group having most of a positive refractive power of the entire system;
- a fourth group including a lens having a relatively weak refractive power; and a fifth group including a negative lens having a concave surface facing the screen, the lens having the strongest positive refractive power among the lenses of said third group being a cemented doublet comprising a concave lens of a high dispersion material having an Abbe's number $\nu_d$, of not larger than 45 and a convex lens of a low dispersion material having an Abbe's number $\nu_d$, of not smaller than 55.

22. A projection lens system according to claim 21, wherein both surfaces of said cemented doublet having the strongest positive refractive power among the constituent lenses of said third group have a radius of curvature which meets a relationship of:

$$|r_1|<|r_3|$$

where,
$r_1$: radius of curvature of the lens surface facing the second group,
$r_{p3}$: radius of curvature of the lens surface facing the fourth group.

23. A projection lens device according to claim 22, wherein the lens having the strongest positive refractive power among the lenses of said third group is a flat-convex or convex meniscus lens having a convex surface toward the second group.

24. A projection lens device according to any one of claims 21 to 23, wherein at least one surface of the lenses of each of said first, second, fourth and fifth groups is aspherical.

25. A projection lens device according to claim 24, wherein the surface of at least one of the constituent lenses of said second group which faces the screen has an aspherical shape which exhibits a stronger light converging action at the peripheral portion than at the central portion of the lens.

26. A projection lens device according to any one of claims 21 to 24, wherein a concave lens made of a high dispersion material having an Abbe's number $\nu_d$ of not greater than 45 is provided in the cemented doublet which constitutes the third group, to face the fourth group.

27. A projection lens device according to claim 26, wherein both surfaces of the concave lens of said cemented doublet of the third group have a radius of curvature which meets a relationship of:

$$|r_3|>|r_2|$$

where,
$r_2$: radius of curvature of the cemented surface
$r_3$: radius of curvature of the lens surface facing the fourth group.

28. A projection lens device according to claim 26, wherein both surfaces of the convex lens of said cemented doublet have a radius of curvature which meets a relationship of:

$$|r_2|>|r_1|$$

where,
$r_1$: radius of curvature of the lens surface facing the second group
$r_2$: radius of curvature of the cemented surface.

29. A projection lens device according to claim 26, wherein the surfaces of said cemented doublet have a radius of curvature which meets a relationship of:

$$|r_3|>|r_2|>|r_1|$$

where,
$r_3$: radius of curvature of the lens surface facing the fourth group
$r_2$: radius of curvature of the cemented surface
$r_1$: radius of curvature of the lens surface facing the second group.

30. A projection lens device according to any one of claims 8 to 10 or claims 21 to 24, wherein said fifth group comprises a negative lens having a concave surface to face the screen and a fluorescent face glass having a convex surface to face an electron gun.

31. A projection lens device according to claim 30, wherein said fluorescent face glass of the fifth group is of a shape having a center of curvature on the screen side and having a radius of curvature which is larger at the periphery thereof than at the center thereof.

32. A projection television system using a projection lens device for magnification projecting an original image displayed on a display screen onto a screen,
said projection lens device comprising in sequence from the screen to the display screen:
a first group of lenses including a plastic lens which is convex toward the screen at a center thereof and concave at a periphery thereof;
a second group of lenses having a weak positive refractive power toward the screen at a center thereof and a stronger positive refractive power at a periphery thereof;
a third group of lenses including a lens which shares most of a positive refractive power of an entire system of the projection lens device having a plurality of groups of lenses;
a fourth group of lenses having a relatively weak refractive power; and
a fifth group of lenses including a negative lens which is concave toward the screen and a fluorescent face of a CRT of the display screen.

33. A projection television system according to claim 32 wherein said fluorescent face of the CRT tube has a glass plane of a convex shape toward the opposite side to the screen.

34. A projection television system according to claim 33 wherein said fluorescent face of the CRT tube has a center of curvature facing the screen and a larger radius of curvature at a center thereof than at a periphery thereof.

35. A projection lens device for magnification-projecting an original image displayed on a display screen of an image display device onto a screen, characterized by:
at least two of a plurality of lenses of said projection lens device being plastic lenses;
a first one of said two plastic lenses being convex at a center thereof and concave at a periphery thereof;
a second one of said two plastic lenses having a weak positive refractive power at a center thereof and a stronger positive refractive power at a periphery thereof;
whereby a change of a refractive index caused by a change of surrounding temperature or humidity and a change of the refractive index caused by a change of shapes of lenses are cancelled out by combining partially convex or concave lens shapes of said first and second plastic lenses.

36. A projection lens device for magnification-projecting an original image displayed on a display screen of an image display device onto a screen, characterized by:
- at least two of a plurality of lenses of said projection lens device being plastic lenses;
- a first one of said two plastic lenses being convex at a center thereof and concave at a periphery thereof;
- a second one of said two plastic lenses being an aspherical lens having a weak positive refractive power at a center thereof and a stronger positive refractive power at a periphery thereof,
- binding means for radially binding one or both of said first and second plastic aspherical lenses at an area other than an effective diameter area of the lens.

37. A projection lens device for magnification-projecting an original image displayed on a display screen onto a screen, comprising in sequence from the screen to the display screen;
- a first group of lenses including a plastic lens which is convex toward the screen at a center thereof and concave at a periphery thereof;
- a second group of lenses having a weak positive refractive power toward the screen at a center thereof and a stronger positive refractive power at a periphery thereof;
- a third group of lenses including a lens which shares most of a positive refractive power of an entire system of the projection lens device having a plurality of groups of lenses;
- a fourth group of lenses having a relatively weak refractive power; and
- a fifth group of lenses including a negative lens which is concave toward the screen, and
- binding means for radially binding one or both of said two aspherical plastic lenses at an area other than an effective diameter area of the lens.

38. A projection lens device according to claim 37 wherein said binding means radially binds the aspherical plastic lens of said first group lens which is convex toward the screen at the center thereof and concave at the periphery thereof, at the area other than the effective diameter area of the lens.

39. A projection lens device according to claim 37 wherein said binding means radially binds the aspherical plastic lens of said second group lens which has the weak positive refractive power toward the screen at the center thereof and the stronger positive refractive power at the periphery thereof, in the area other than the effective diameter area of the lens.

40. A projection lens device according to claim 37 wherein said binding means radially binds the aspherical plastic lens of said first group lens which is convex toward the screen at the center thereof and concave at the periphery thereof, and the aspherical plastic lens of said second group lens which has the weak positive refractive power toward the screen at the center thereof and the stronger positive refractive power at the periphery thereof, in the area other than the effective diameter area of the lens.

41. A projection lens device according to claim 36 wherein said binding means comprises a ring which has an inner diameter L' which meets a relationship of $$L' < (1.001 \times L)$$

where L is an outer diameter of the aspherical plastic lens in a dry state, and which is made of a material having a higher rigidity than plastic and fitted to the outer periphery of the aspherical plastic lens in the area other than the effective diameter area of the lens.

42. A projection lens device according to claim 36 wherein said binding means comprises a ring which has an inner diameter L' which meets a relationship of $$L' < (1.001 \times L)$$

where L is an outer diameter of the aspherical plastic lens in a dry state, and which is made of a material having a higher rigidity than plastic and screw-loaded, fitted or insertion-molded to a portion of a lens body tube which holds and secured said aspherical plastic lens.

43. A projection lens device according to claim 36 wherein said binding means comprises a lens bodytube having a ring which has an inner diameter L' which meets a relationship of $$L' < (1.001 \times L)$$

where L is an outer diameter of the aspherical plastic lens in a dry state, and which is made of a material having a higher rigidity than plastic and which is screw-loaded, fitted or insertion-molded to an area of the lens bodytube which is to hold and secure the aspherical plastic lens.

44. A projection lens device for magnification-projecting an original image displayed on a display screen of an image display device onto a screen, characterized by:
- at least two of a plurality of lenses of said projection lens device being plastic lenses;
- a first one of said two plastic lenses being convex at a center thereof and concave at a periphery thereof;
- a second one of said two plastic lenses having a weak positive refractive power at a center thereof and a stronger positive refractive power at a periphery thereof;
- a cova formed at a flat outer periphery supported by the bodytube, outside of the effective diameter area of the lens in one or both of said first and second plastic aspherical lenses,
- a notch formed in said cova, a resilient member for absorbing the expansion of the lens by elastic deformation, fitted in or insertion-molded to said notch;
- a relationship of $2R' > (1.001 \times L)$ being met, where L is a diameter of the lens in a dry state, and R' is a radial distance between the center of the lens and an outermost point of the fitted or insertion-molded resilient member.

45. A projection lens device for magnification-projecting an original image displayed on a display screen of an image display device onto a screen, characterized:
- at least two of a plurality of lenses of said projection lens device being plastic lenses;
- a first one of said two plastic lenses being convex at a center thereof and concave at a periphery thereof;
- a second one of said two plastic lenses having a weak positive refractive power at a center thereof and a stronger positive refractive power at a periphery thereof;
- a lens bodytube for one or both of said first and second plastic aspherical lenses having at least three securing holes on an outer wall thereof for holding and securing the plastic aspherical lens, resilient members projecting from the outside to the inside of said holes for radially holding and securing the plastic aspherical lens;

the lens bodytube means a relationship of $D < (1.001 \times L)$ where D is a diameter of an inscribed circle connecting apexes of the projections of said resilient members and L is a diameter of the plastic aspherical lens in a dry state.

46. An optical system for converging a light ray flux from an original image to be focused on a screen, said optical system comprising at least two plastic lenses, wherein said lenses have a weaker lens power than that of an overall lens system in the vicinity of an optical axis, and at a portion spaced apart from the optical axis, at least one lens element has a concave shape and at least one of a remaining lens element has a convey shape in the periphery thereof.

47. An optical system for converging a light ray flux from an original image to be focused on a screen, said optical system comprising at least two plastic lenses, wherein said lenses have a weaker lens power than that of an overall lens system in the vicinity of an optical axis, and at portions through which a peripheral optical flux passes obliquely in the periphery of said lenses, at least one of said plastic lenses has a convex shape and the other of said plastic lenses has a concave shape.

48. A projection lens for magnification-projection an original image on a screen comprising at least one glass lens sharing most of the lens power of an entire projection lens system and at least one plastic correction lens arranged on a screen side of said glass lens, wherein said plastic correction lens has a larger positive lens power at its periphery than that at its center portion so that a marginal light ray is converged.

49. A projection lens according to claim 48, wherein said plastic correction lens is arranged closely to a convex lens sharing most of the lens power of the entire projection lens system.

50. A projection lens for magnification-projecting an original image on a screen comprising, in sequence from a screen, five groups of lenses including:

a first group of lenses including at least one lens having a weaker lens power than that of an entire projection lens system;

a second group of lenses including at least one lens having a weaker lens power than that of the entire projection lens system;

a third group of lenses including at least one lens having most of the lens power of the entire projection lens system;

a fourth group of lenses including at least one lens having a weaker lens power than that of the entire projection lens system; and a fifth group of lenses including at least one lens having a negative lens power and a convex surface facing the screen;

wherein an effective diameter $D_4$ of a lens located nearest to said third group among the lenses constituting said second group and an effective diameter $D_9$ of a lens located nearest to said fifth group among the lenses constituting said fourth group have the following relationship:

$$D_9 \leq D_4$$

51. A projection lens for magnification-projecting an original image on a screen comprising, in sequence from a screen, five groups of lenses including:

a first group of lenses including at least one lens having a weaker lens power than that of en entire projection lens system;

a second group of lenses including at least one lens having a weaker lens power than that of the entire projection lens system;

a third group of lenses including at least one lens having most of the lens power of the entire projection lens system;

a fourth group of lenses including at least one lens having a weaker lens power than that of the entire projection lens system; and a fifth group of lenses including at least one lens having a negative lens power and a convex surface facing the screen, wherein at least one lens constituting said first group having a screen-facing lens surface with a central shape causing image light to be converged on an image plane and a peripheral shape causing the image light to be diverged on the image plane.

52. A projection lens according to claim 51, wherein at least one lens of the lenses constituting said first group is made of a high dispersion material having an Abbe's number not smaller than 45 and has a central shape causing image light to be converged on the image plane and a peripheral shape causing the image light to be diverged on the image plane.

53. A projection lens according to claim 51, wherein at least one lens of the lenses constituting said first group is made of a high dispersion material having an Abbe's number not smaller than 45 and has a shape which is convex at its center and concave at its periphery.

54. A projection lens for magnification-projecting an original image on a screen comprising a plurality of lenses, wherein one of said plurality of lenses is made of a high dispersion material having an Abbe's number not smaller than 45 and has s shape which is convex at its center and concave at its periphery.

55. A projection lens according to claim 54, wherein the screen-facing surface of said lens has a shape which is convex at its center and concave at its periphery.

56. A projection lens according to claim 54, wherein the original-image-facing surface of said lens has a shape whose radius of curvature is located on the side of the original image.

57. A projection lens for magnification-projecting an original image on a screen comprising a plurality of lenses wherein at least one lens is arranged on the original image side with respect to a lens sharing most of positive lens power of an entire projection lens system so that when light ray flux to be focused at the periphery of an image of field passes a plane including an optical axis and an object point, it passes substantially the entire region from the optical axis of said at least one lens to the aperture at the lower end thereof, or at least one lens is arranged on the side of the screen with respect to said lens sharing most of positive lens power of the entire projection system so that said light ray flux passes substantially the entire region from the optical axis of said at least one lens to the aperture at the upper end thereof.

58. A projection lens for magnification-projection an original image on a screen comprising a plurality of lenses wherein at least one lens is arranged on the screen side with respect to a lens sharing most of positive lens power of an entire projection lens system so that when light ray flux to be focused at the periphery of an image of field passes a plane including an optical axis and an object point, it passes substantially the entire region from the optical axis of said at least one lens to the aperture at the upper end thereof, and at least one of said plurality of lenses is made of a high dispersion material having an Abbe's number not smaller than 45 and has at least one surface having a shape which is convex at its center and concave at its periphery.

* * * * *